US00RE37215E

(19) United States
(12) Reissued Patent
Dammeyer et al.

(10) Patent Number: US RE37,215 E
(45) Date of Reissued Patent: Jun. 12, 2001

(54) FORK LEVEL INDICATOR FOR LIFT TRUCKS

(75) Inventors: Ned E. Dammeyer, New Bremen; Todd M. Fullenkamp, Ft. Recovery; Harold A. Stammen, New Bremen, all of OH (US)

(73) Assignee: Crown Equipment Corporation, New Bremen, OH (US)

(21) Appl. No.: 09/360,184

(22) Filed: Jul. 23, 1999

Related U.S. Patent Documents

Reissue of:
(64) Patent No.: 5,738,187
Issued: Apr. 14, 1998
Appl. No.: 08/692,409
Filed: Aug. 5, 1996

U.S. Applications:
(

(62) Division of application No. 08/439,985, filed on May 12, 1995, now Pat. No. 5,586,620.

(51) Int. Cl.[7] ..... B66F 9/16; B66F 9/24
(52) U.S. Cl. ..... 187/222; 414/642; 701/50; 340/429
(58) Field of Search ..... 187/222, 227, 187/237; 414/633–636, 640, 641, 642; 701/50; 340/937, 429, 689; 901/1, 47

(56) References Cited

U.S. PATENT DOCUMENTS

| | | | | |
|---|---|---|---|---|
| 3,319,816 | * | 5/1967 | Christenson | 414/636 |
| 3,865,265 | | 2/1975 | Brudi et al. . | |
| 3,883,021 | * | 5/1975 | Wihelm | 414/634 |
| 4,004,460 | * | 1/1977 | Whipps | 73/178 R |
| 4,221,530 | | 9/1980 | Williams, IV et al. . | |
| 4,279,328 | | 7/1981 | Ahlbom . | |
| 4,411,582 | * | 10/1983 | Nakada | 414/636 |
| 4,491,918 | | 1/1985 | Yuki et al. . | |
| 4,541,049 | * | 9/1985 | Ahlbom | 701/23 |
| 4,566,032 | | 1/1986 | Hirooka et al. . | |
| 4,678,329 | | 7/1987 | Lukowski, Jr. et al. . | |
| 4,957,408 | | 9/1990 | Ohkura . | |
| 5,011,358 | | 4/1991 | Andersen et al. . | |
| 5,131,801 | * | 7/1992 | Melanson | 414/635 |
| 5,208,753 | | 5/1993 | Acuff . | |
| 5,749,696 | * | 5/1998 | Johnson | 414/635 |

FOREIGN PATENT DOCUMENTS

| | | |
|---|---|---|
| 2 242 670 | 4/1990 | (GB) . |
| 2-147600 | 6/1990 | (JP) . |

* cited by examiner

*Primary Examiner*—Robert P. Olszewski
*Assistant Examiner*—Thuy V. Tran
(74) *Attorney, Agent, or Firm*—King & Schickli PLLC

(57) ABSTRACT

A fork lift truck includes a fork level sensor located in the forks, away from the vertical mast of a lift truck for detecting the true level of the forks, and a vision system including a camera which may take several forms. In one form, a single camera is mounted in a housing which may be moved to a protected location vertically either by sliding in the carriage assembly, or by use of a parallelogram device. In another form, multiple cameras are employed where a second camera may be either mounted above the first camera in the same housing or mounted between the forks. Alternatively, the first camera may perform multiple roles by being moved vertically from a first predetermined location below the bottom of the forks to a higher elevation a second predetermined location relative to the forks. A video display terminal, which shows the view observed by the camera, may also include a fork level indicator, a reticle for assisting in adjusting the vertical position of the forks, and an indicator showing the specific truck function selected by the operator.

6 Claims, 21 Drawing Sheets

FIG-3
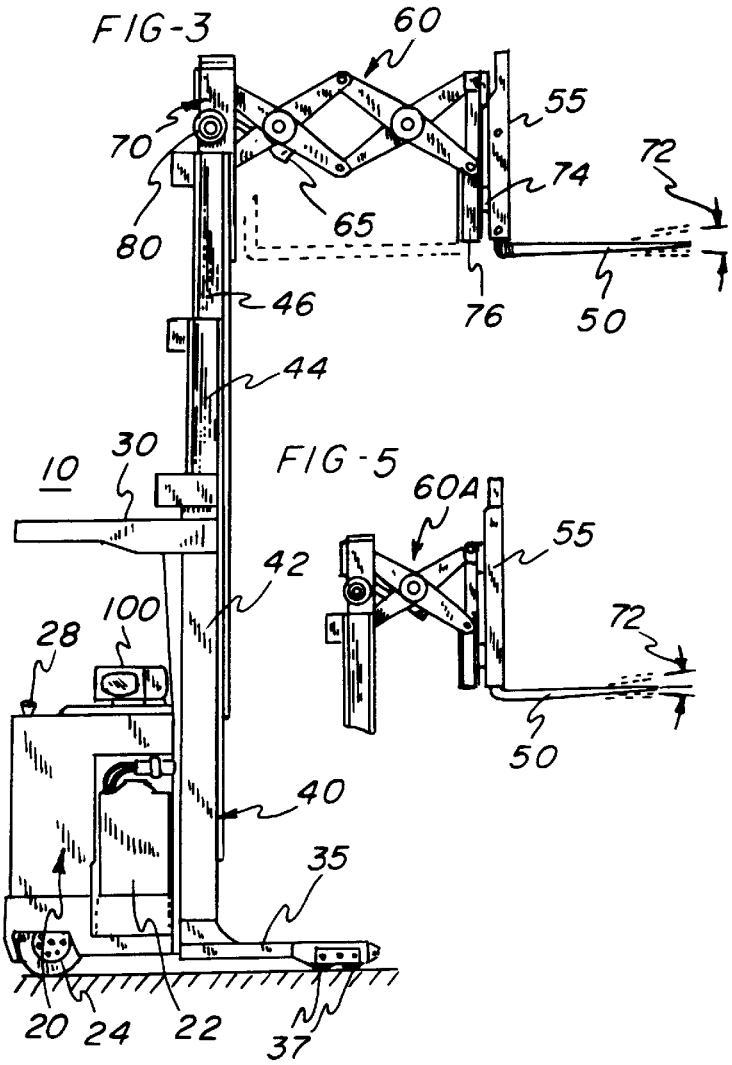
FIG-4
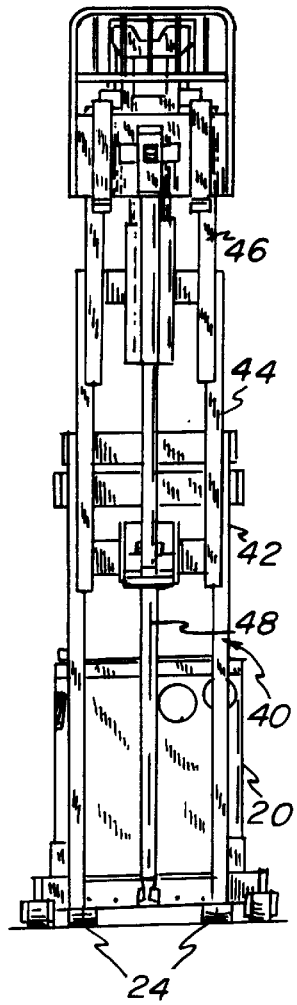
FIG-5
FIG-2
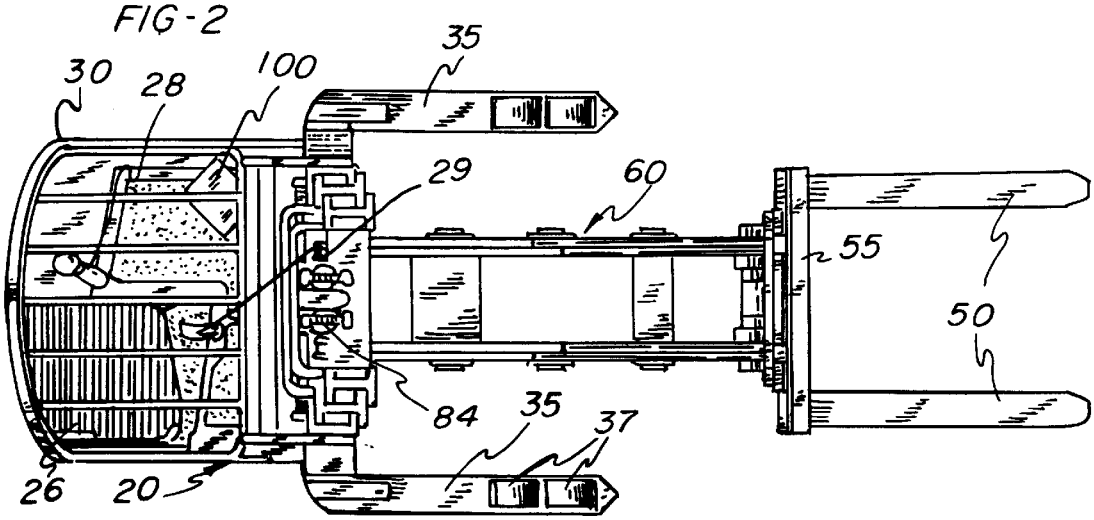

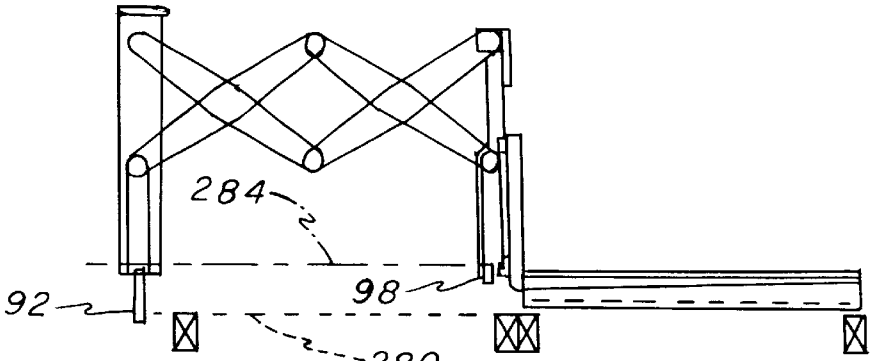
FIG-26D
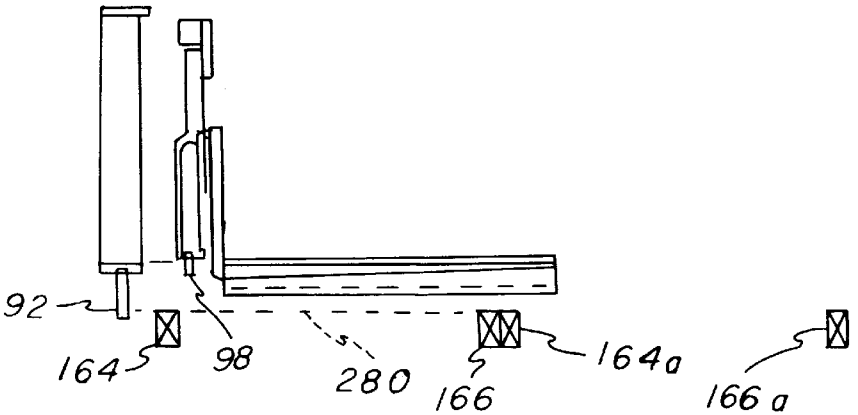
FIG-26-E
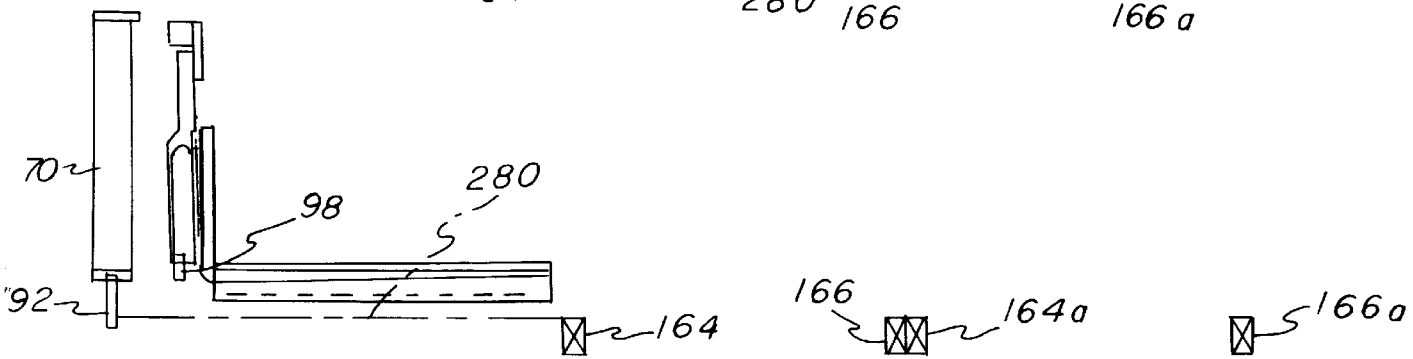
FIG-26-F

FORK LEVEL INDICATOR FOR LIFT TRUCKS

Matter enclosed in heavy brackets [ ] appears in the original patent but forms no part of this reissue specification; matter printed in italics indicates the additions made by reissue.

RELATED APPLICATION

This application is a division of application Ser. No. 08/439,985, filed May 12, 1995, now U.S. Pat. No. 5,586,620, issued Dec. 24, 1996.

BACKGROUND OF THE INVENTION

This invention relates to a remote viewing method and apparatus for use on fork lift trucks. This invention has particular application to those fork lift trucks where the forks can be raised above the head of the operator causing the operator difficulty in visually aligning the forks to a load or a load on the fork to an opening in a storage rack.

In many materials handling vehicles, such as a rider-reach truck or a three- or four-wheel counterbalanced truck, a pair of movable, load carrying forks are mounted on a carriage for vertical movement on the mast of the truck. A camera has sometimes been mounted near the heel of the forks to view the scene in front of the forks, and to display that scene on a monitor mounted in view of the operator. Such an arrangement is helpful, provided the camera is properly positioned so that its view is properly aligned with the forks; however, the view of a camera in this location will be blocked when a pallet is placed on the forks. With a load on the forks, the best position for the camera is below the bottom of the load for use in operator viewing under-clearance or viewing alignment with a target below the load; however, in this position, the camera is subject to damage when the forks are lowered near the floor on which the truck is operating. If the camera is fixed positioned to be clear of the floor when the forks are fully lowered, then its view will be too high to be effective for viewing below the forks and load.

The operator view problem is exacerbated on double reach trucks, that is, trucks with scissors mechanisms that permit the forks to be doubly extended, and thus pick up and deposit loads twice the storage depth distance of a single pallet. The operator's view of the double deep load position in the rack is not visible from this position.

Some lift trucks provide a fork tilt indicator, however, these indicators measure fork tilt relative to the truck's mast, not relative to a horizontal plane. Further, monitoring fork tilt either by sensing the vertical component of the fork or at the heel of the fork will not take into consideration the deflection of the fork away from the mast due to the weight of a load.

SUMMARY OF THE INVENTION

The present invention includes a fork level sensor located in the forks, away from the vertical mast of a lift truck, which sensor detects the true level of the forks, with and without a load on the forks.

This invention also includes a camera, which is equipped with a horizontal plane reticle and mounted on a vertically movable carriage assembly and which is protected from damage and contact with the floor when the forks are in their lowermost position. The camera is lowered to a first predetermined position below the forks and load when the forks are raised, which provides the camera with a view that is optimum for viewing a target for vertical height position of the forks or load. When used on a double reach truck with the forks extended, the camera is placed at a second predetermined location relative to the forks, which is above the first predetermined position and which provides the camera with a view above the load support beam or rail of a rack near which the truck is usually placed when operating in this mode. A second camera at a different height may also be used and switching means provided to allow the operator to obtain a view above the load support beam.

A video monitor is provided for use by the operator which, in addition to providing a horizontal plane reticle and a picture of the view observed by the camera, also provides a fork level indicator, and an indicator showing the truck functions selected by the operator. As used herein, the reticle includes a single horizontal line extending across the face of the monitor and a single vertical line at the center of view. This unique presentation aids the operator in controlling the operation of the truck, including the vertical, horizontal and level position of the forks, by reference to that monitor.

It is therefore an object of this invention to provide a level sensor for the forks of a fork lift truck which provides an operator with a true indication of the plane of the forks, with and without load, relative to a horizontal plane.

It is another object of this invention to provide a fork lift truck with a camera which is aligned to define a horizontal plane a predetermined distance below the forks and a visual monitor which includes a representation of the horizontal plane to aid an operator in positioning the forks vertically relative to a pallet or storage rack, particularly when the forks are raised above the operators head.

It is also an object of this invention to provide a vision system for a fork lift truck whereby an operator, by reference to a video monitor, can ascertain and adjust the level position of the forks and the horizontal elevation of the forks relative to a storage rack.

It is a further object of this invention to provide a fork lift truck including a pair of forks for supporting a load, means for raising and lowering the forks, means for tilting the forks relative to the body of the truck, a level sensor mounted on at least one of the forks for providing an indication of the level of the forks with respect to a horizontal plane, a display terminal mounted for viewing by an operator, and means responsive to the level sensor for displaying an indication of the level position of the forks with respect to a horizontal plane on the display terminal thereby to assist the operator in adjusting the level of the forks prior to loading, moving or unloading a load from the forks. Further, the level sensor may be mounted approximately midway the length of the fork.

It is another object of this invention to provide a fork lift truck with a vision system that provides useful images to an operator regarding the elevation of the forks or load for position to a storage rack. It is also an object of this invention to provide the operator with a view of the forks or load while at the same time providing information regarding which function of the truck controls has been selected.

It is a still further object of this invention to provide a lift truck with multiple views, either from a single, movable camera, or from multiple cameras.

It is a yet another object of this invention to provide a fork lift truck including a mast assembly, a carriage assembly mounted for vertical movement in the mast assembly, a pair of forks extending from the carriage assembly for supporting a load, means for raising and lowering the carriage assembly, a camera mounted below the plane of the bottom of the load, the camera having a horizontal plane reticle and lens for viewing the scene immediately in front of the forks, means for positioning the lens of the camera a first predetermined location below the forks when the forks are in a raised position and for raising the camera to a protected position when the forks are in their lowermost position, and a display terminal for presenting to an operator the image of the scene viewed by the camera.

Other objects and advantages of the invention will be apparent from the following description, the accompanying drawings and the appended claims.

BRIEF DESCRIPTION OF THE DRAWINGS

FIG. 2 is a plan view of a double reach truck with the forks fully extended.

FIG. 3 is a side elevational view of the double reach truck of FIG. 2;

FIG. 4 is a front elevational view of the truck of FIGS. 2–3;

FIG. 5 is a side elevational view of the portion of a single reach truck with its forks fully extended;

FIG. 9 shows the scene when the forks are retracted, prior to entry of the forks into a pallet; FIG. 10 shows the forks extended into a pallet; FIG. 11 shows the pallet being lifted; and FIG. 12 shows the scene when the forks are retracted;

FIGS. 23A–23F are side elevational views illustrating the sequence of operations for picking up a pallet from a rack using a single reach fork lift truck with a single camera in a single location below the forks;

FIGS. 26A–26F are side elevational views illustrating the sequence of operations for picking up a pallet from the far rack of a double deep storage rack employing two separate cameras;

FIG. 28 is a plan view. FIG. 29 is a side elevational view, and FIG. 30 is a front elevational view of a camera mounted on a printed circuit board and adjustably supported in a protective housing.

DESCRIPTION OF THE PREFERRED EMBODIMENT

Figure 1:
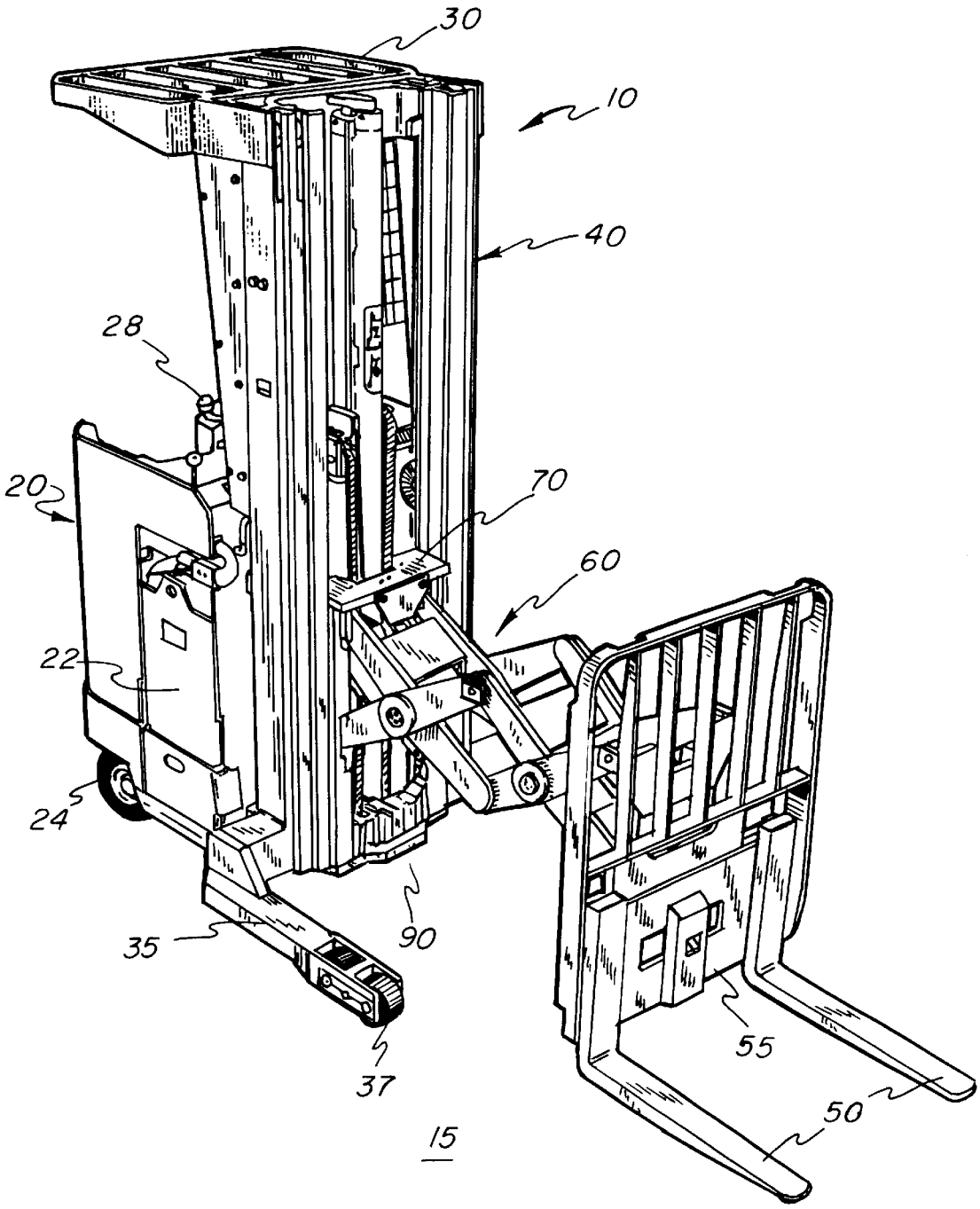
FIG. 1 is a perspective view of a double reach lift truck equipped with a fork level sensor and fork viewing camera and monitor showing the forks fully lowered and extended.

Referring now to the drawings, and particularly to FIGS. 1–5, a self propelled rider-reach lift truck 10 is illustrated as one type of materials handling truck which may incorporate the present invention. The lift truck shown is a model RD 3000 Series truck manufactured by Crown Equipment Corporation, the assignee of the present invention. It is to be understood, however, that other fork lift trucks could also incorporate the present invention, such as Crown models FC, RC, RR, SC and W fork lift trucks.

The truck 10, which operates on floor 15, includes a body 20 that contains a battery 22 supplying power to the truck and various other components, such as electric traction motors (not shown) connected to steerable wheels 24 and hydraulic motors (not shown) which supply hydraulic pressure to fork lift cylinders, as will be explained. An operator's compartment 26 is included on the body 20, along with steering control 28 and control handle 29, which controls the operation of various functions of the truck. An overhead guard 30 is placed over the operator's compartment. Forward of the body 20 are outriggers 35 carrying front support wheels 37.

Figure 6:
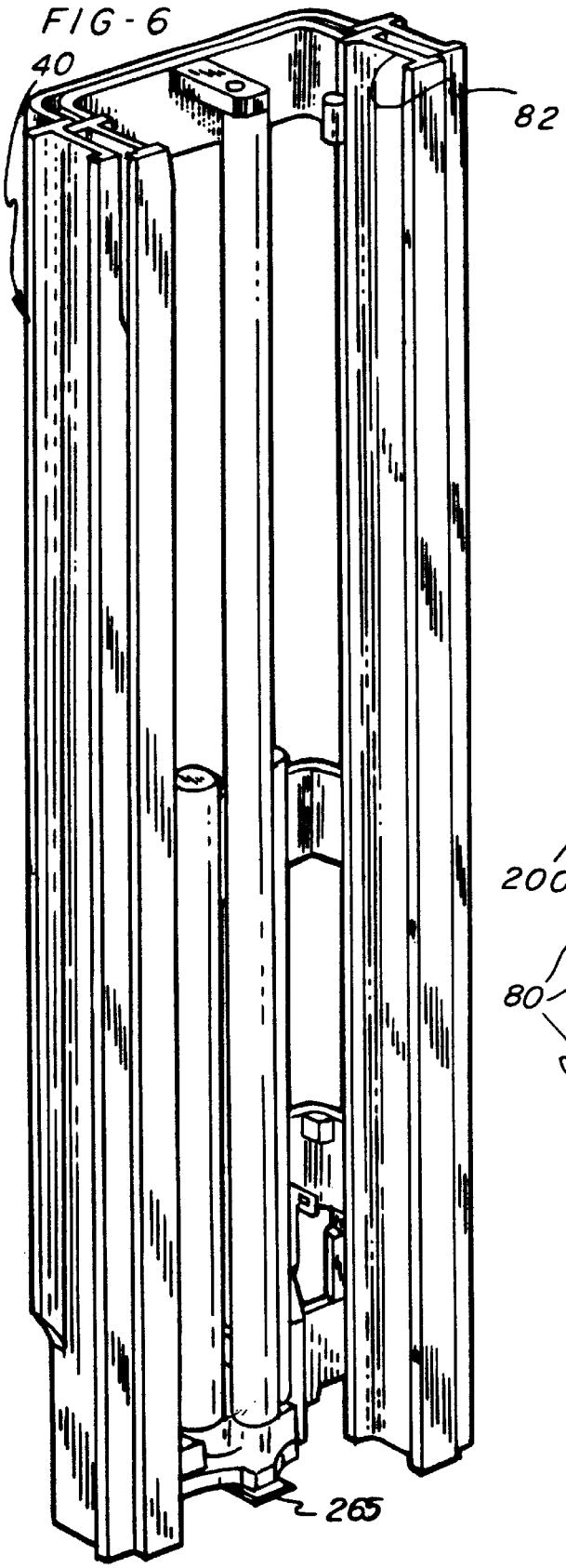
FIG. 6 is a perspective view of a mast assembly of the truck shown in FIG. 1.

A mast assembly 40, which is also shown separately in FIG. 6, extends vertically from the front edge of the body 20. The mast assembly 40 includes a pair of stationary channel member 42 and nested movable channel members 44, 46 which may be extended by hydraulic cylinders 48 from a lower position, as shown in FIG. 1, to a fully raised position, as shown in FIG. 3.

A pair of forks 50 are carried by a fork carriage 55 which in turn is mounted on a reach mechanism 60 supported on a reach support carriage or vertically movable carriage assembly 70. The forks may be tilted through a range, shown by the arrows 72 by means of a hydraulic cylinder 74 mounted between a plate 76 and the fork carriage 55. The forks 50 are movable from side-to-side relative to the plate 76. The reach mechanism 60 may be extended and retracted by hydraulic cylinders 65. FIG. 3 shows a double reach mechanism 60 while FIG. 5 shows a single reach mechanism 60A.

Figure 7:
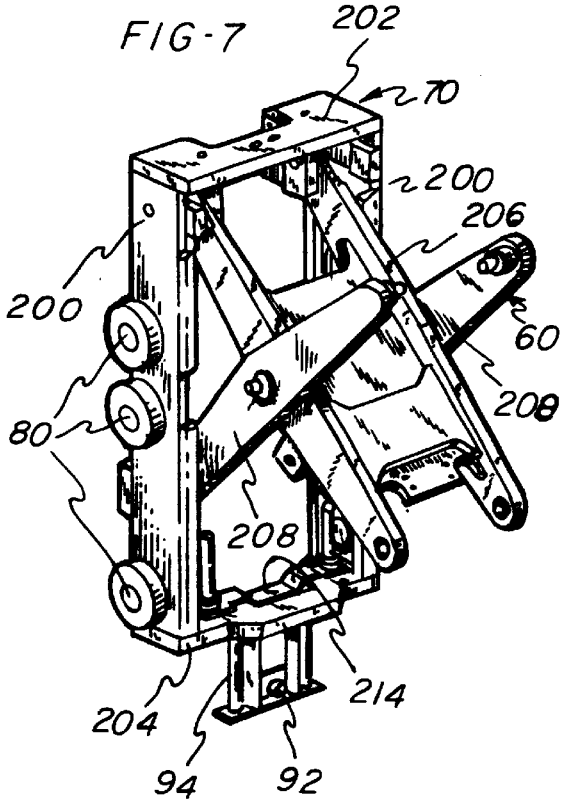
FIG. 7 is a perspective view of a vertically movable carriage assembly showing a camera assembly mounted at the lower portion thereof.

The carriage assembly 70, which is shown separately in FIG. 7, rides on rollers 80 within channels 82 in the mast assembly and is moved vertically by means of chains 84.

Camera means 90 provides the operator with a view in front of the forks on a television or video display monitor or terminal 100 mounted on the body 20 and adjacent the operator's compartment 26. As shown in FIGS. 2 and 3, the monitor 100 is mounted to the left of the operator's compartment 26 and is conveniently placed for the operator's use as the forks are manipulated relative to a pallet.

Figure 8:
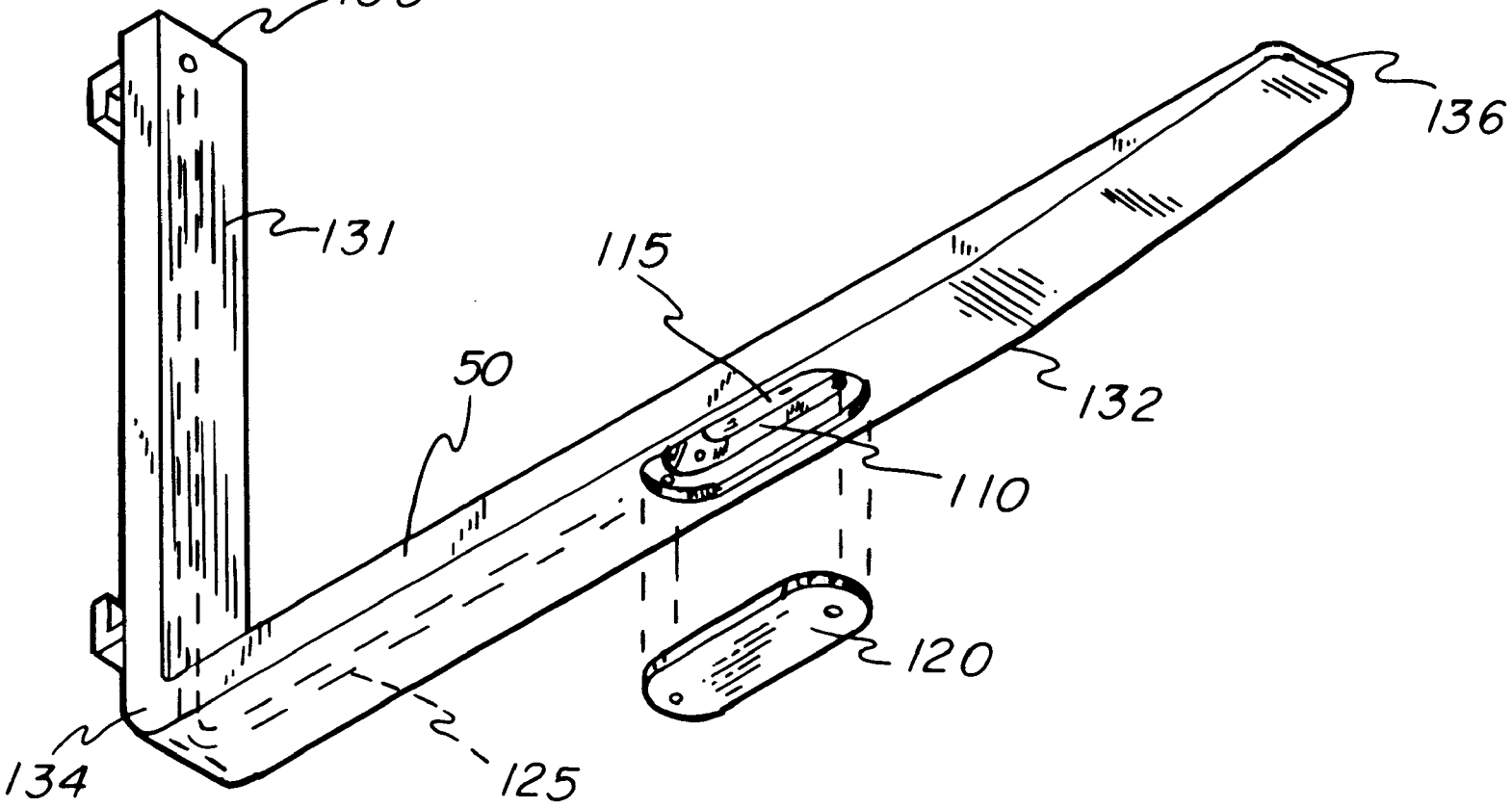
FIG. 8 is a perspective view of a portion of a fork showing the installation of a fork level sensor.

FIG. 8 is perspective view of one of the forks 50 which contains a fork level sensor 110. When removing forks from or inserting forks into a pallet, or when transporting a load, it is desirable for the operator to know whether the forks are level with the horizontal plane. Even if the forks were level before a pallet was loaded, the forks may deflect when a load is placed thereon. When moving a load, and when the operator places a load on a rack, the pallet preferably should be nearly horizontal as possible. A load which is tilted will require more vertical space to clear the storage opening so the amount of tilt actually achieved should be known to and minimized by the operator. The level sensor 110 will provide the essential information to the operator via the video monitor 100. Of course, a separate fork level indicator could be provided and would be necessary if no camera system were included on any particular vehicle. The level indicator may take several forms, such as an analog meter or a set of light emitting diodes, etc.

The level sensor 110 is preferably mounted in a protected location, such as a cavity 115 machined into one of the forks, which cavity is closed by a cover plate 120 which is made flush with the bottom of the fork. Electrical cables connecting the level sensor 110 are routed through an opening 125 which is formed by drilling the fork prior to its being bent into the L-shape shown in FIG. 8. The fork shown has an essentially constant cross-section from upper end 130 of its vertical component 131 to approximately half of its horizontal length, at 132, where it begins to taper. The level sensor is placed at about the horizontal mid-point of the fork, where the taper begins. In those fork which are tapered from the heel 134 to the end 136, the level sensor should be placed as far from the heel as is practicable. Several types of level sensors may be used in the present invention, such as an electrolytic tilt sensor or a non-inertial tilt sensor.

The output of the level sensor is displayed on the monitor 100, a representation of which is shown in FIGS. 9–14, as a horizontal bar 150 which is referenced against an index 155. If the ends of the forks are tilted up relative to a true horizontal plane, then the bar 150 will be above the center of the index 155; if the fork ends are tilted down, then the bar 150 will be below the center of the index 155.

The display on monitor 100 also includes means for generating a reticle or cross mark 160 to assist the operator in adjusting the position of the fork carriage assembly relative to a visual target. The horizontal bar 161 of the reticle represents a horizontal plane across the central view of and at the height of the camera. The wide camera view permits vertical height adjustment to a load position with the truck turned in excess of 45° from the face of the rack.

The camera is placed with its central field of view in a horizontal plane. When the mast assembly 40 is fixed and vertical, the camera means 90 is preferable fixed to the carriage assembly 70 with its central axis horizontal. While the mast assembly of many fork lift trucks are vertically orientated, some trucks may include mast assemblies which are tilted relative to vertical or which may be tiltable, such as the Crown models FC, RC and SC counterbalanced rider trucks. When a camera is used on a truck with a permanently tilted mast assembly, the camera view is simply aligned to be horizontal. When a camera is mounted on a truck with a tiltable mast, the actual tilt position of the mast must be positioned to a known angle before the central view of the camera can be assumed to be in a horizontal plane for purposes of vertical positioning of the carriage assembly.

In normal operation of placing the forks into a pallet, an operator will adjust the height of carriage assembly 70 so that the reticle's horizontal bar 161 will align to an operator's estimated position, or with the bottom of a marker 162 mounted on front surface of a horizontal section 164 of a storage rack. The marker 162 may be employed to insure a more precise vertical alignment of the forks. The bottom of the marker 162 shown is typically three inches below the top of the horizontal section 164.

The various truck function that are controlled by control handle 29 are selected by a push button 175 on the control handle and are represented by icons 170 placed both on the monitor 100 and on an operator's display panel located above the operator's compartment. Icon 171 represents side-to-side control of the forks; icon 172 represents fork tilt control; icon 173 represents horizontal extension or reach of the forks by means of the reach mechanism 60; and icon 174 represent raising and lowering the fork carriage assembly. The icons in the embodiment shown are printed and attached to the face of the monitor 100, but they could also be represented by an electronically generated icon.

When the push button switch 175 on the control handle 29 is pressed, the various functions are sequentially selected. Since the operator will be controlling the operation of the forks primarily by reference to the monitor 100 when the forks are not in view, it is a convenience to provide information relative to the function selected along with a view of the field in front of the forks and the level position of the forks at the same place, on the video monitor 100. This is done by a function display generator 178 which causes the area on the video monitor directly behind the icon representing the selected function to be illuminated, or by electronically generating a brightened icon.

Figure 13:
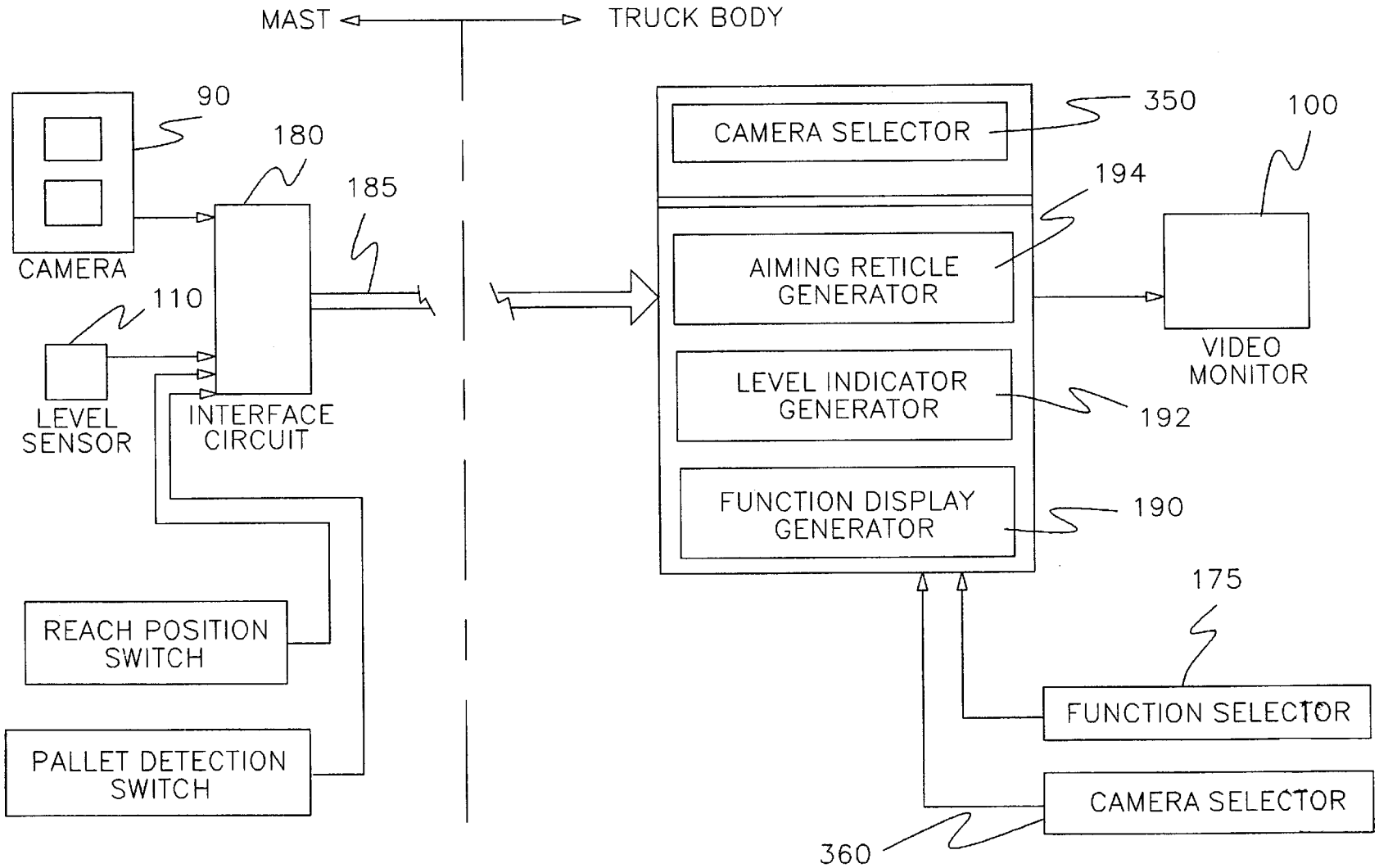
FIG. 13 is a simplified block diagram showing the relationship among the various components of the display system, including a camera, fork level sensor and video monitor.

FIG. 13 is a block diagram showing in simplified form the electrical connections from the camera means and level sensor movably mounted on the mast assembly to an interface circuit 180, a bus 185 which connects the mast to the body of the truck where the signals are passed to a pattern generator 190, which includes a fork level bar and reference generator 192, an aiming reticle generator 194, and a function display generator 178.

Figure 16:
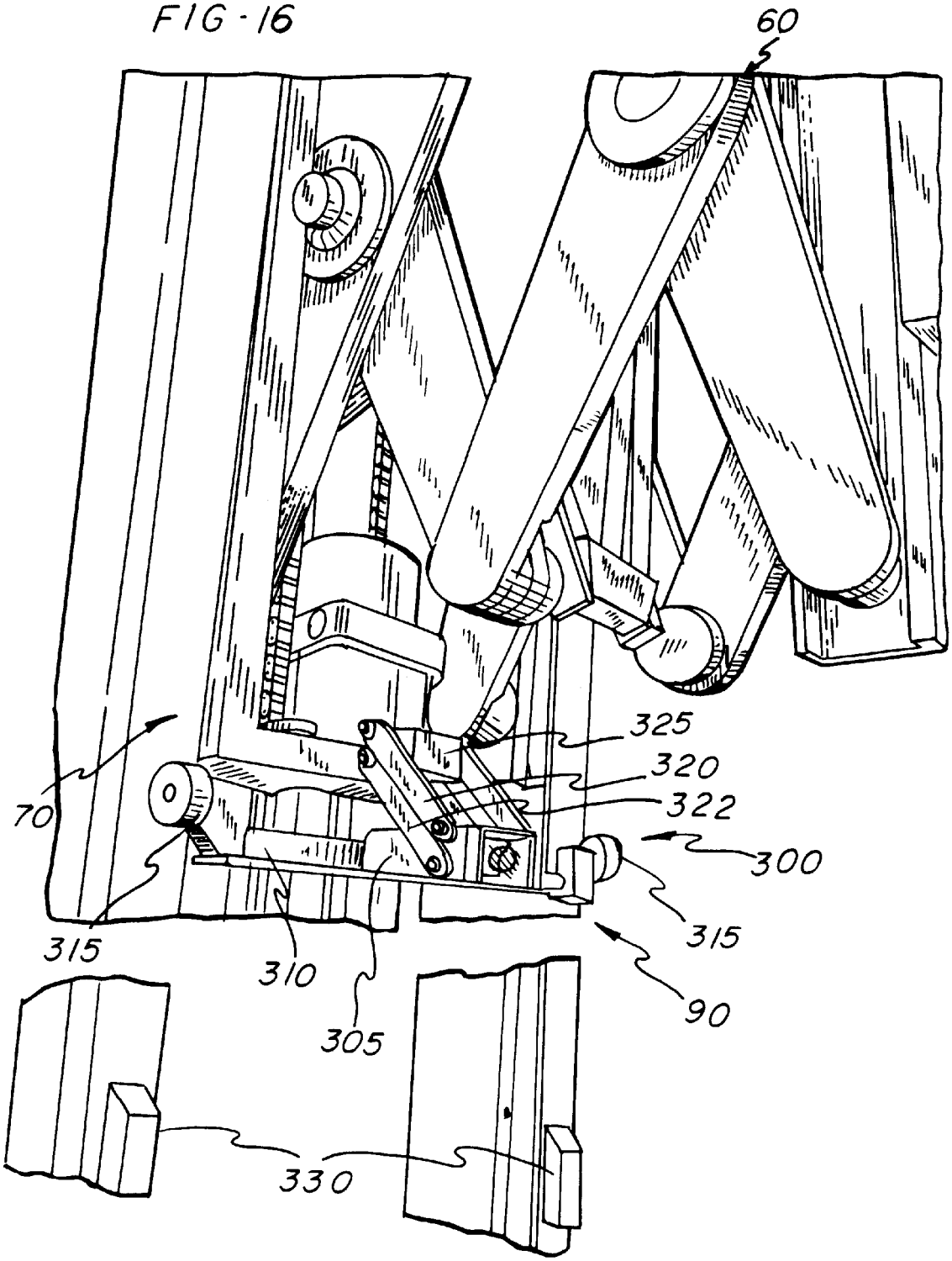
FIG. 16 is a perspective view showing an alternative embodiment of the invention where the camera is supported on a parallelogram assembly at the lower part of the carriage assembly.

The camera means 90 of the present invention may take several forms. In one form, shown in FIG. 14, a single or first camera 92 is mounted in a housing 94 which may be moved vertically either by sliding in the carriage assembly 70 or, as shown in FIG. 16, in a housing 305 supported on the carriage assembly 70 by means of a parallelogram device 300.

The camera means 90 may also include a second camera. In one embodiment, the second camera may be a camera 96 (FIG. 14) mounted above the first camera in the housing 94. In this embodiment, the second camera 96 will be placed above the first camera, closer to the plane of the forks 50. In another embodiment, the second camera will be camera 98 (FIG. 15) mounted centrally between the forks 50 on the fork carriage 55, but behind the vertical component 131 to protect it against damage by contact with a pallet or its load. The camera 98 will also be located above the bottom plane of the forks 50 to protect the camera from damage whenever the forks are lowered to the floor. The view of camera 98 will typically be located near the top plane of the forks 50.

Alternatively, in place of a second camera, the first camera 92 may itself be moved vertically from a first predetermined location, below the bottom of the forks, to a higher elevation, a second predetermined location relative to the forks. Although not shown, optical paths utilizing mirrors, prisms, or fiber optics could be used with a single camera to provide the desired views. If necessary, one or more lamps (visible or infrared) may be included with the camera to aid in illuminating the view in front of the cameras.

One form of the camera means 90 is shown in FIGS. 7 and 17–22 where a single camera 92 is mounted in a housing 94 and supported in carriage assembly 70. The carriage assembly 70 is formed from a pair of vertical channels members 200, a top plate 202 and a bottom plate 204. At one end of the reach mechanism 60, arms 206 are pivotally attached to the upper part of the carriage assembly, as shown in FIG. 7, while arms 208 are provided with rollers 210 and are slidably mounted in grooves 212 in the channel members 200. A hydraulic cylinder 65 (FIG. 3) controls the arms 206 to either extend or retract the reach mechanism and thus to move the forks 50 generally horizontally. The carriage assembly bottom plate 204 has a U-shape, when viewed from above, with the camera 92 placed in a recess 214. A pair of bumper strips 216 are placed on the bottom surface of plate 204.

The camera 92 is placed in a housing 94 formed from a pair of vertical plates 232, a top plate 234, a bottom plate 236 and a back vertical plate 237. The camera 92 is mounted on a printed circuit board 238 which is adjustably mounted within the housing 94. Lens 93 of the camera 92 faces forward, toward the ends of the forks. The printed circuit board contains the necessary video circuits to connect the camera with the interface circuit 180. While camera 92 is described herein, it is to be understood that the following also applies to cameras 96 and 98.

Figure 28:
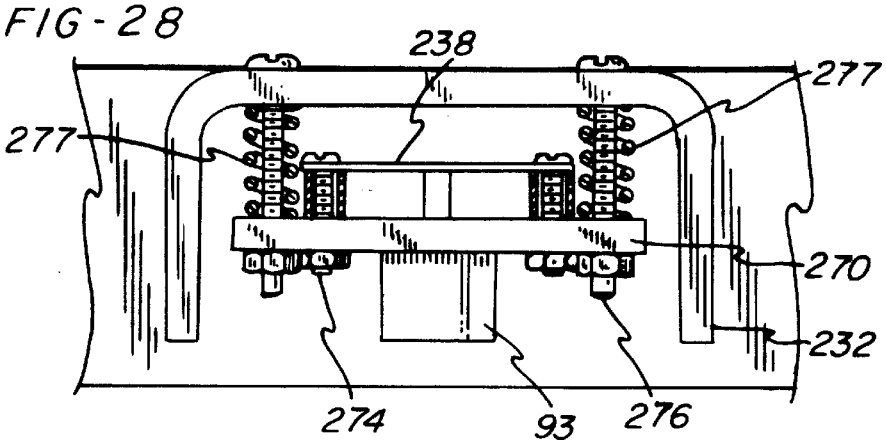
FIGS. 28, 29 and 30 show a mounting arrangement for a camera whereby the camera may be aligned vertically, horizontally and rotationally.
Figure 29:
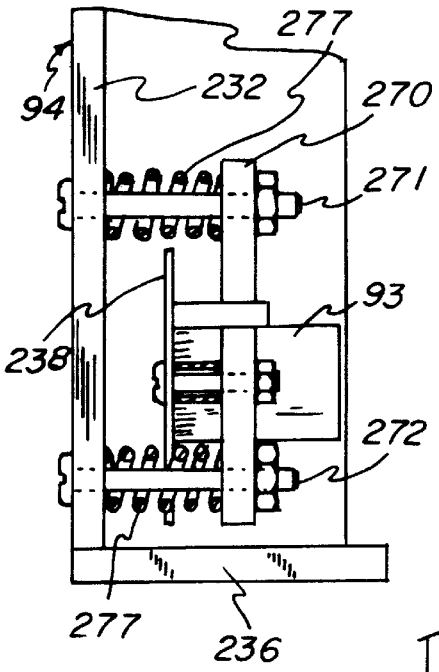
Figure 30:
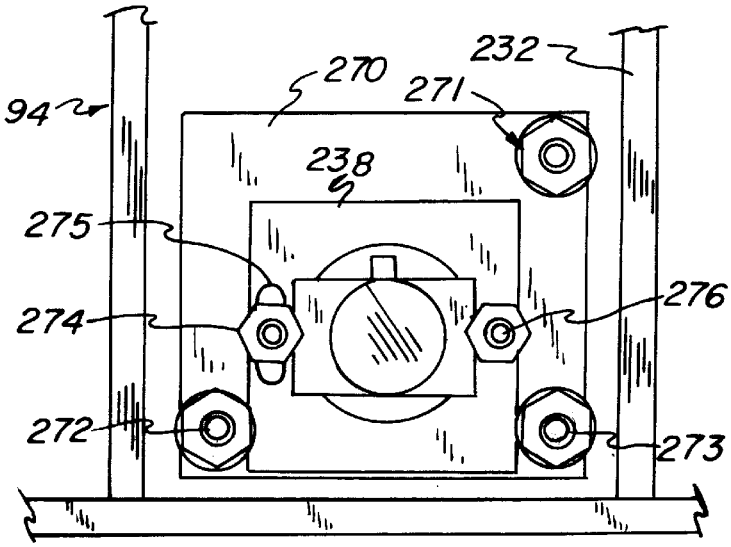

The camera means is provided with means for adjusting its field of view, specifically, means for adjusting the field of view vertically, horizontally and rotationally to permit calibration of the camera view, thereby to insure that the horizontal reticle truly defines a horizontal plane. Referring to FIGS. 28–30, a plate 270 is attached to the means for adjusting the field of view of the camera, which means includes two adjustment bolts 271 and 272, and bolt 273 which is surrounded by a spacer. The printed circuit board 238 is mounted to the plate 270 by two bolts; bolt 274 extends though a slot 275 in the plate 270 while bolt 276 acts as a pivot around which the board 238 may be adjusted rotationally. Springs 277 surround each of the bolts 271 and 272 to urge the plate 270 outwardly, away from the plate 232 of the housing 94. Nuts on each of these bolts may be tightened or loosened to position the plane of the plate 270 vertically and horizontally. Thus, the field of view of the camera mounted on the board 238 may be adjusted vertically, horizontally and rotationally.

Figure 18:
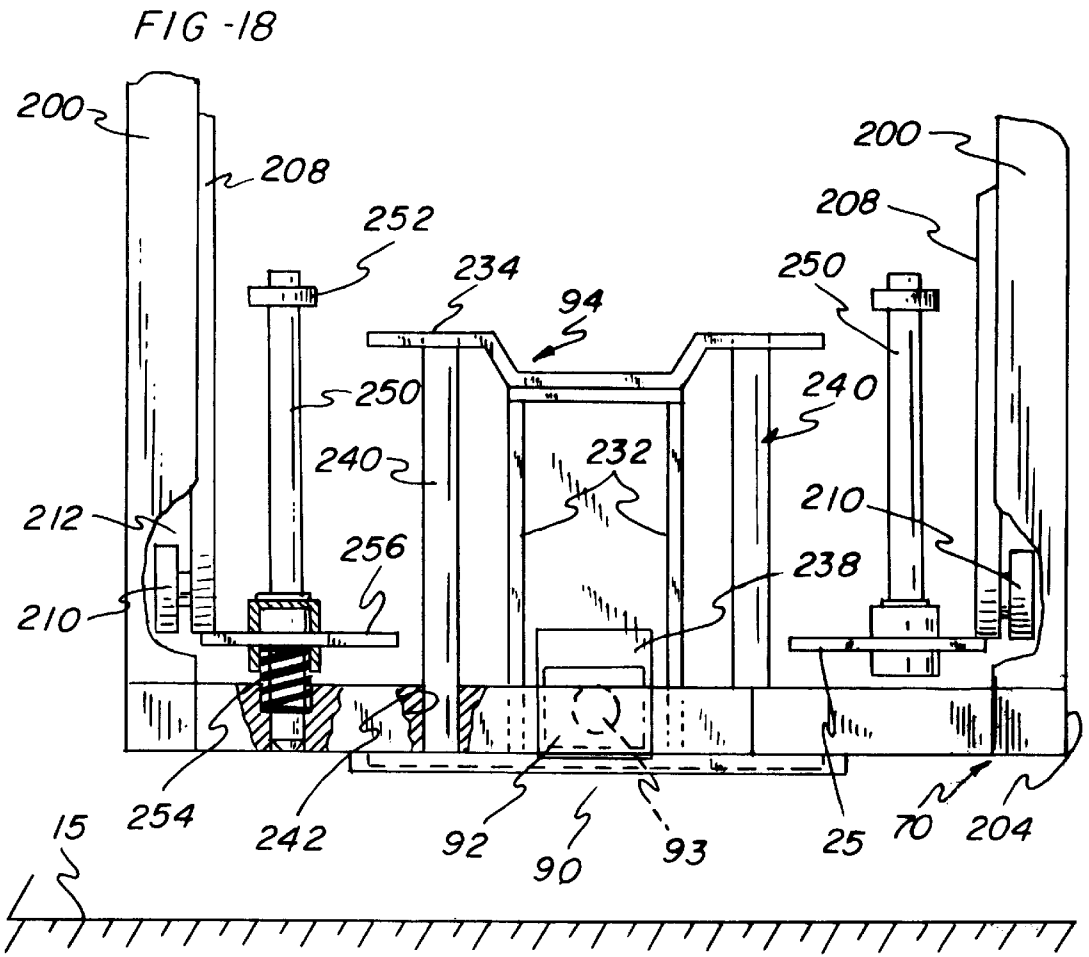
FIG. 18 is a partial front elevational view corresponding to FIG. 17 and shows the camera in its uppermost of protected position.
Figure 17:
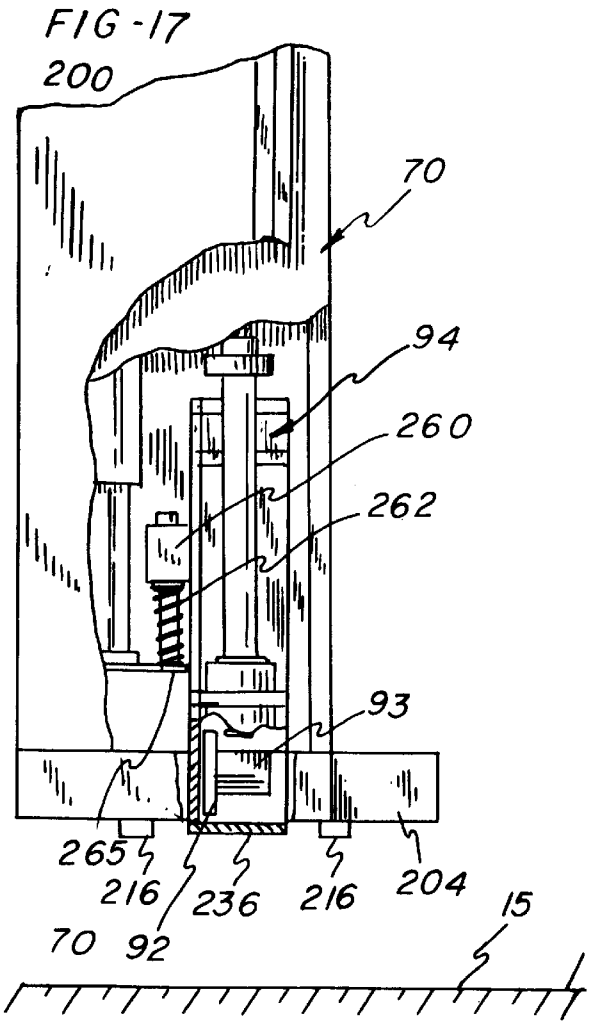
FIG. 17 is a partial side elevational view of the lowermost portion of a carriage assembly showing a camera assembly and its relationship to the carriage assembly when the carriage assembly is in its lowermost position.
Figure 20:
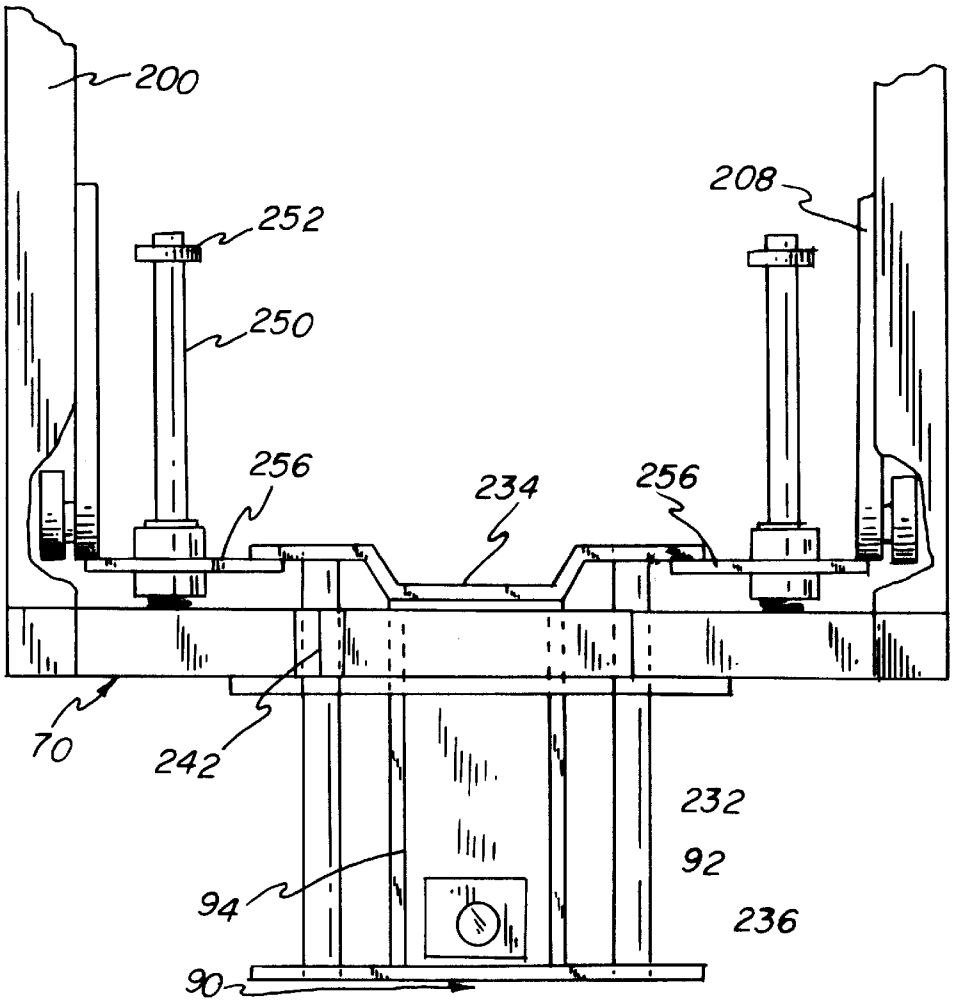
FIG. 20 is a partial front elevational view corresponding to FIG. 19 and shows the camera lowered to a first predetermined location below the carriage assembly.

A pair of rods 240 extend from the top plate 234 to the bottom plate 236 through linear bearings 242 placed in the carriage assembly bottom plate 204. Thus, the camera 92 may move vertically relative to the plate 204, from a fully down position shown in FIGS. 19 and 20, to a fully up position. FIGS. 17 and 18, and an intermediate position, FIGS. 21 and 22.

Figure 19:
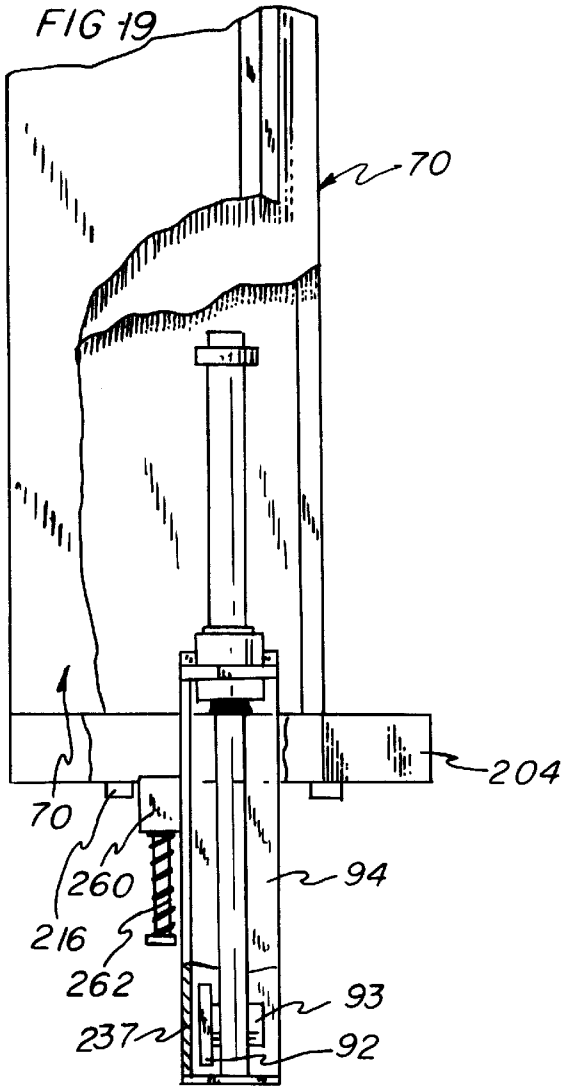
FIG. 19 is a partial side elevational view of the lowermost portion of a carriage assembly showing the camera assembly and its relationship to the carriage assembly when the carriage assembly is in a raised position.
Figure 22:
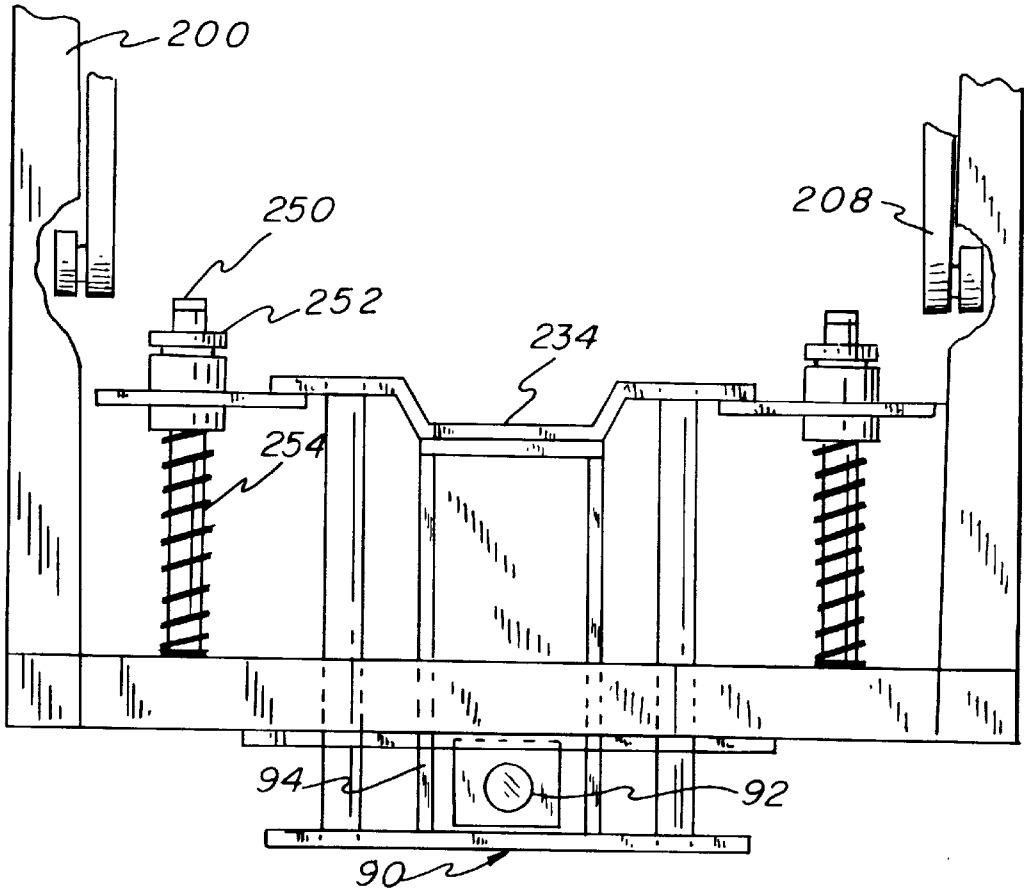
FIG. 22 is a partial from elevational view corresponding to FIG. 21 and shows the camera lowered to a second predetermined location below the carriage assembly.

Extending upwardly from the carriage assembly bottom plate 204 are a pair of rods 250, each provided with a roll pin 252 at the top thereof. A spring 254 surrounds each rod 250, and a movable flange 256 is placed over the spring. The movable flange 256 includes a large circular plate which extends under the ends of the camera top plate 234 and also under the arm 208 of the reach mechanism. The springs 254 are of sufficient strength to move the camera means 90 upwardly when not restrained by the flange 256. In FIGS. 17 and 19, the reach arms 208 hold the flange 256 down against the plate 204 while in FIG. 21, the arms 208 are shown to have moved upwardly, and the movable flange 256 is in its uppermost position, having been stopped in its spring powered upward movement by the roll pin 252.

Figure 21:
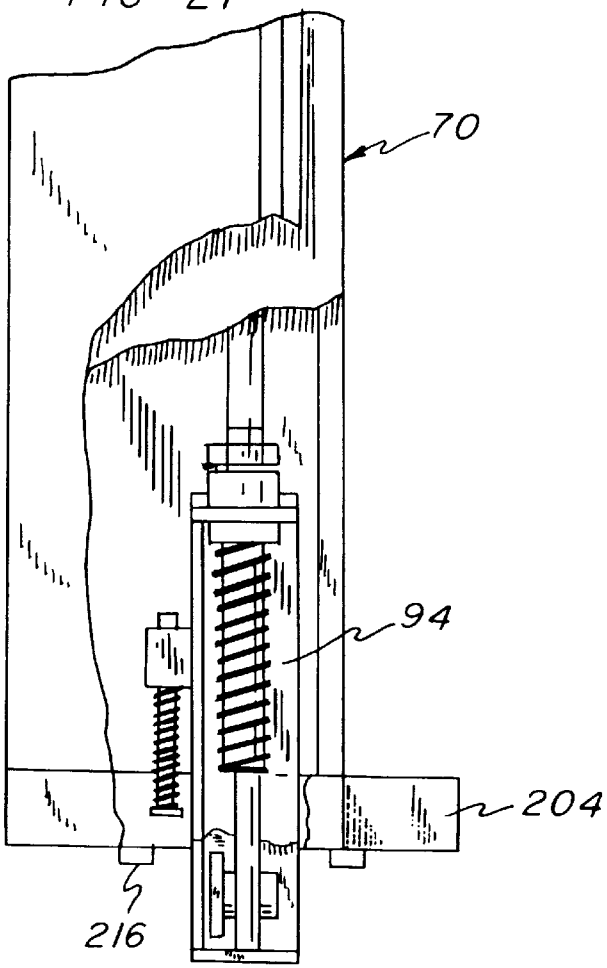
FIG. 21 is a partial side elevational view of the lowermost portion of a carriage assembly showing the camera assembly and its relationship to the carriage assembly when the carriage assembly is in a raised position and the forks of a double reach truck are extended.

As shown in FIGS. 17, 19, and 21, a bracket 260 is attached to the back vertical plate 237 of the camera housing and a spring loaded rod 262 extends downwardly therefrom. The lower end of the rod is placed to engage a stop plate 265 attached to the mast assembly 40, as shown in FIGS. 6 and 17. When the carriage assembly is lowered, the rod 262 will engage the stop plate 265 and this will cause the camera housing 94 to move up until the bottom plate 236 contacts the bottom plate 204. Thus, in this position, the camera 92 is protected against coming into contact with the floor and damage from any debris that may be on the floor 15.

FIG. 16 shows an alternative embodiment for mounting camera means 90 on carriage assembly 70. A parallelogram device 300 supports camera housing 305 is mounted on a horizontal bar 310 that is provided with a pair of rollers 315 at the ends thereof. A pair of arms 320, 322 are mounted on both sides of the camera housing 305 and extend to a bracket 325 attached to the carriage assembly 70. The hinge points of arms 320, 322 on both the bracket 325 and the housing 305 are vertically arranged, and thus a parallelogram is formed which maintains the camera means 90 level at all times. A pair of ramps 330 mounted on the lower portion of the mast assembly engage the rollers 315 when the carriage assembly is lowered, causing the camera housing 305 to be raised, and thus remain clear of the floor 15 when the carriage assembly is in its lowermost position.

SINGLE CAMERA IN RETRACTABLE MOUNT, SINGLE REACH FORKS

Referring now to FIGS. 23A–23F, which are side elevational views showing a carriage assembly 70 in the raised position, similar to FIG. 3, the method of pallet pickup using a single reach fork lift truck and a single camera will be described. When the carriage assembly 70 is raised above the floor 15 (FIG. 3), the camera housing 94 will be lowered to the position shown in FIGS. 23A–23F and FIGS. 19–20. In this position, the camera 92 has a view centered on a horizontal plane or view line 280, which is approximately 6.25 inches below the top surface of level forks 50, or approximately 4.5 inches below the bottom of the forks. Plane 280 corresponds to the horizontal line of reticle 160.

Figure 23A:
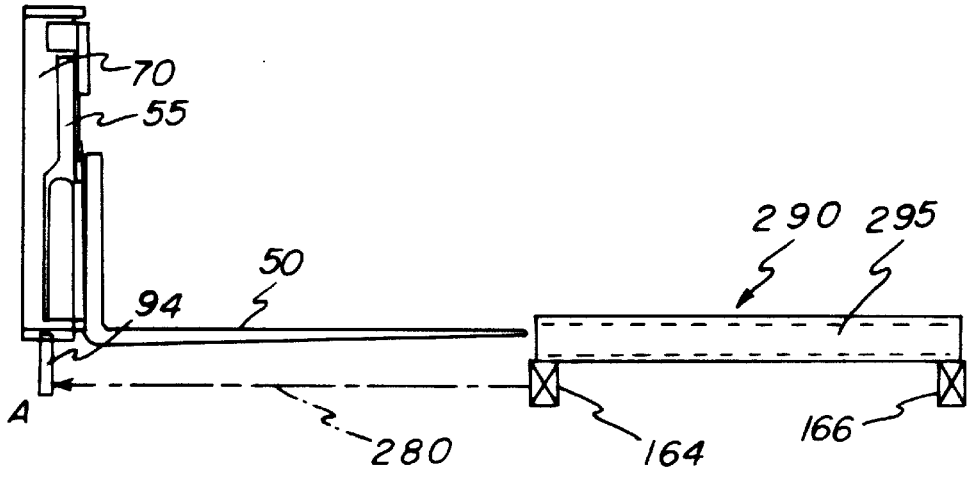

The operator will first position the truck to face the rack 290 upon which a pallet 295 is placed. In some applications, the operator must make vertical height alignment of the forks while the truck is partially turned toward the face of the rack. In FIG. 23A, only the forward and rear horizontal bars 164, 166 of the rack are shown, but it is to be understood that shelving may be suspended between the bars and that, as shown in FIGS. 9–12, vertical columns 168 support the bars 164, 166.

The operator, selecting the Side-shift mode represented by icon 171, centers the forks relative to the carriage assembly 70. The truck is then aligned relative to the rack, as shown in FIG. 23A, and the carriage assembly is elevated so that the horizontal bar 161 of the reticle 160, is placed or aligned with the bottom of the marker tape 162. The operator then selects the Tilt mode represented by icon 172 and causes the ends of forks 50 to be tilted slightly downward, by reference to the horizontal bar 150 and reference mark 155. The operator views the fork and the pallet 295 by reference to the monitor 100, which provides a view of the load present on the pallet, and the side-shift alignment of the forks.

Figures 9, 10, 11, 12:
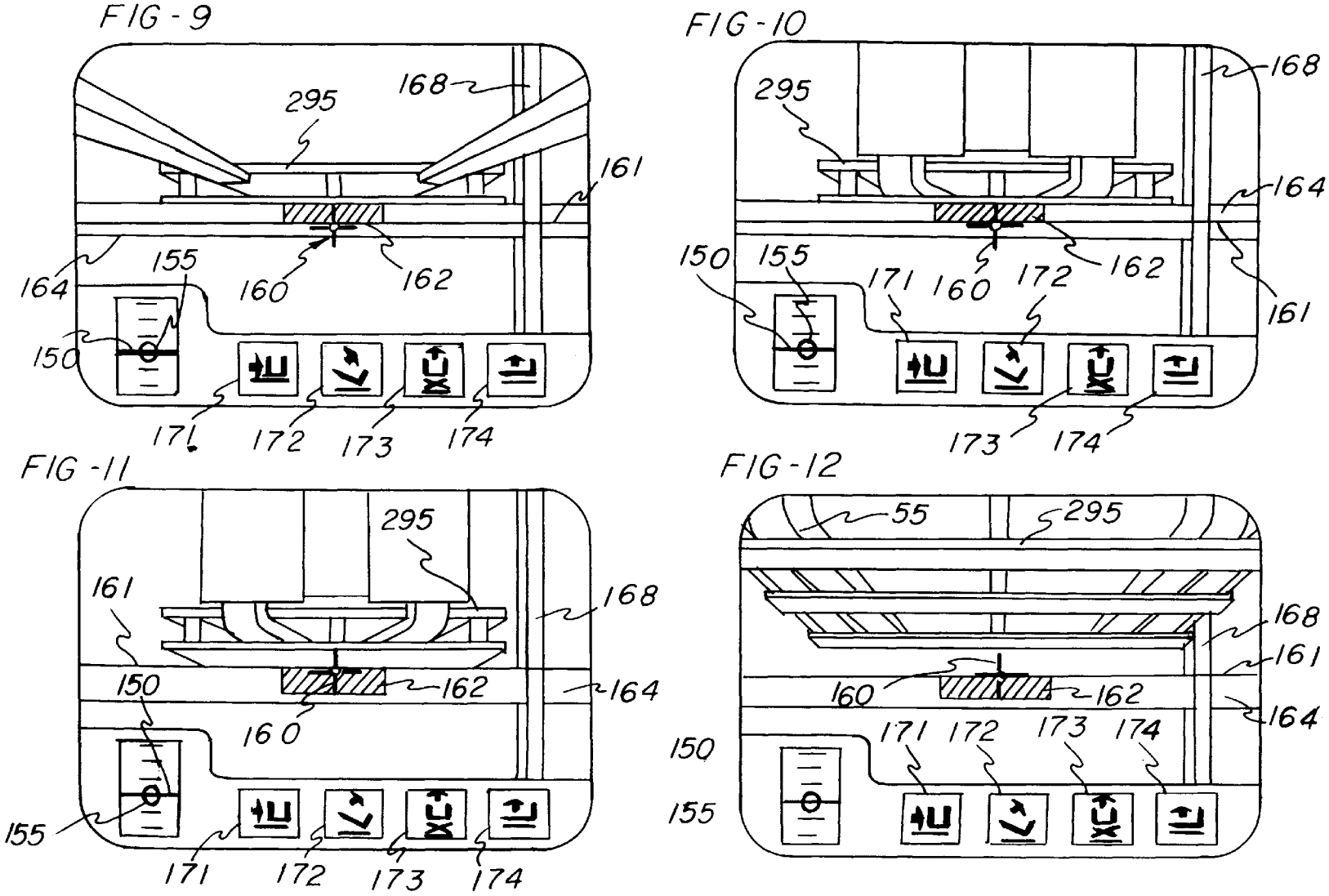
FIGS. 9–12 are representations of the scene as viewed by a camera.
Figure 23B:
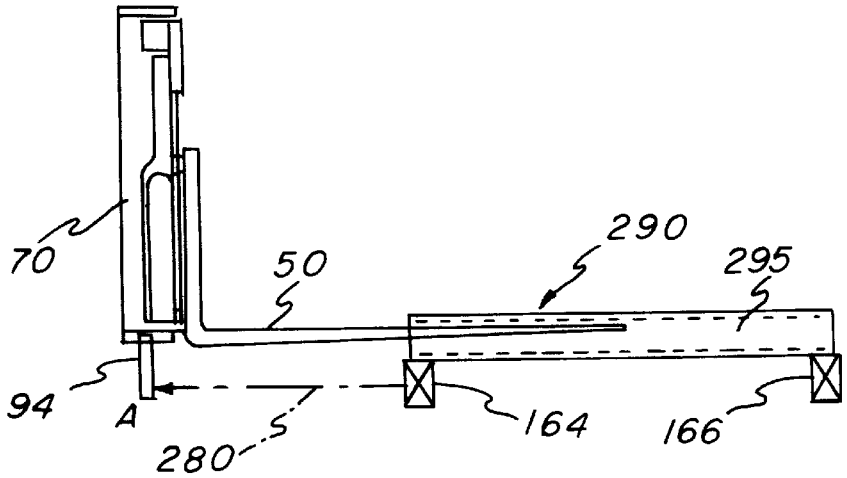
Figure 23C:
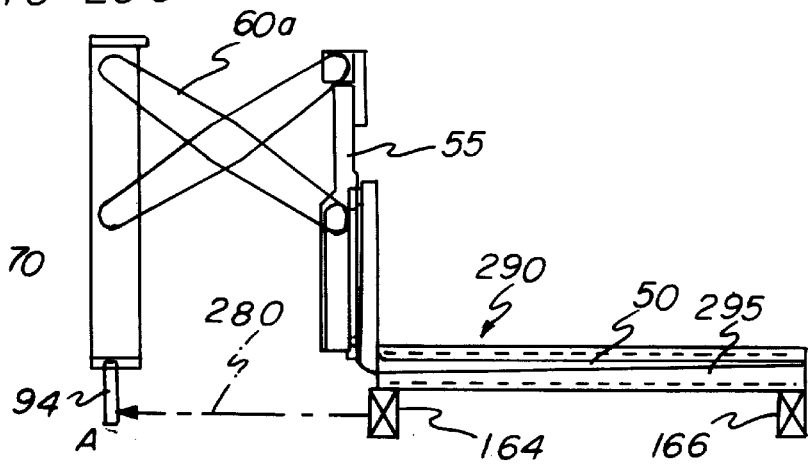

In a single reach truck, the operator will typically drive the truck forward until the front support wheels 37 are even with the face of the rack, a short distance while verifying the target height alignment on the monitor 100 so that the forks extend into the pallet without interference from either the top or the bottom of the pallet, as illustrated in FIG. 23B, and then the operator selects the Reach mode represented by icon 173 and extends the fork carriage 55 so that the forks fully extend into the pallet, as illustrated in FIG. 10 and FIG. 23C.

Figure 23D:
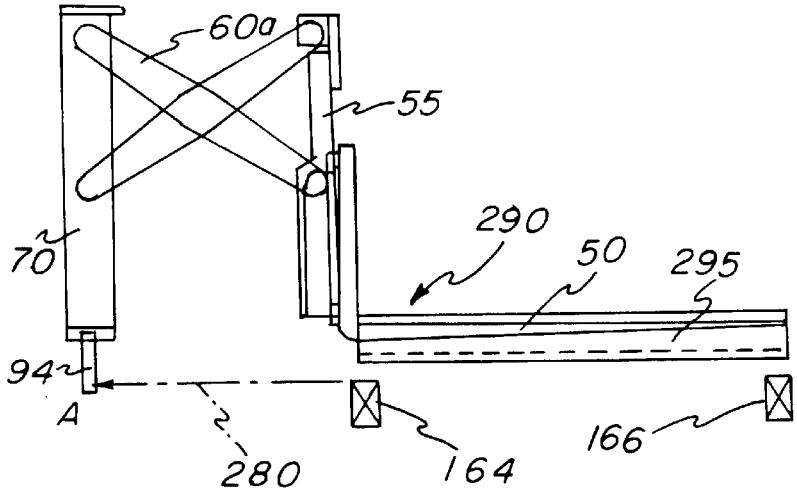

The operator then selects the Raise/Lower mode represented by icon 174 and will adjust the elevation of the pallet, stopping the carriage assembly so that the horizontal bar 161 of reticle 160 is at or slightly above the top edge of the rack, as shown in FIGS. 11 and 23D. The forks are then tilted slightly up by selecting the Tilt mode represented by icon 172 and by reference to the fork level indicator 150 and reference mark 155. At this point, the operator has a clear view of the underside of the pallet and can see whether it is clear of the rack horizontal bars 164 and 166.

Figure 23E:
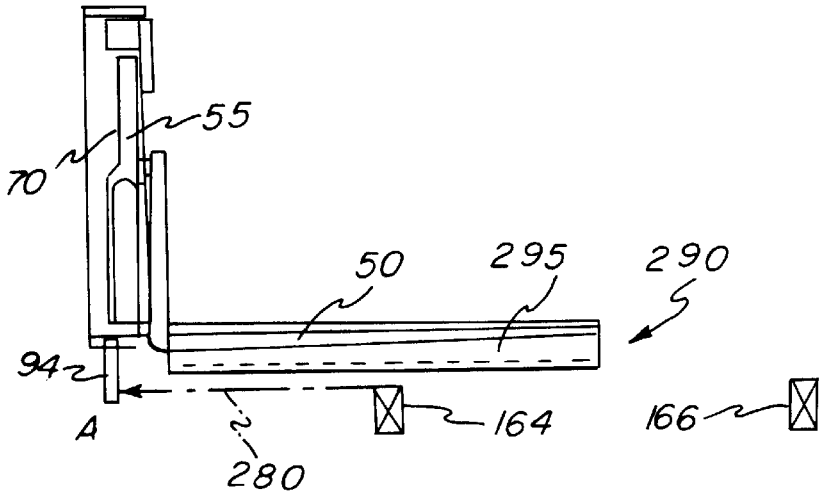
Figure 23E:
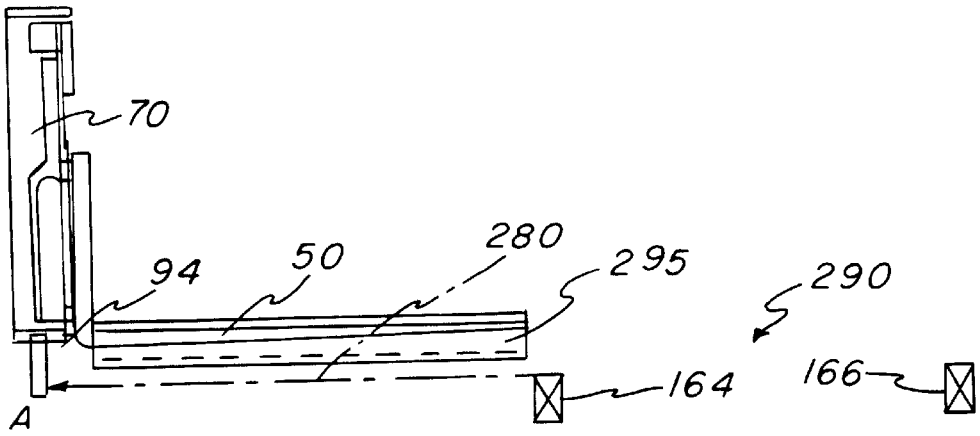

In FIG. 23E, the operator selects the Reach mode represented by icon 173 and retracts the fork carriage and the load while viewing the movement of the pallet relative to the rack, as illustrated on the monitor in FIG. 12. The operator then drives the truck rearwardly. FIG. 23F, while verifying aisle clearance and then lowers the load for transport to another location. When depositing a pallet on a rack, the operation describe above is essentially reversed.

In the above described mode, camera means 90 includes a single camera 92 which is placed a first predetermined location below the forks. This camera, of course, will be protected for contact with the floor 15 whenever the carriage assembly 70 is lowered to the floor 15, as shown in FIGS. 17 and 18.

SINGLE CAMERA IN RETRACTABLE MOUNT, DOUBLE REACH FORKS

Referring now to FIGS. 24A–24F, a typical operation of a double reach fork lift truck will be described. In this embodiment, a single camera is employed, however the camera may be placed at one of two predetermined location relative to the forks.

In normal operation to remove a load from a rack, the operator will first position the truck to face a rack 290 upon which a pallet 295 is placed. As shown in FIGS. 24A–24F, a double depth rack is illustrated, and the pallet 295 is located on the far or rear rack. The rack 290 comprises a first or from section including horizontal bars 164 and 166, and a second or rear section including horizontal bars 164a and 166a. Again, while not shown, shelving may be placed top of the bars 164, 166, 164a and 166a.

After assuring that the forks are centered relative to the fork carriage, the operator will select the Raise/Lower mode, icon 174, and will place the horizontal bar 161 of reticle 160 at the bottom edge of the marker 162, which is shown three inches down from the top of bar 164. This places level forks 50 approximately one inch below the top inner surface of the pallet. The ends of the forks are then lowered slightly by tilting and by reference to the fork level indicator 150 and reference mark 155 on the monitor 100.

Figures 24A, 24B, 24C:
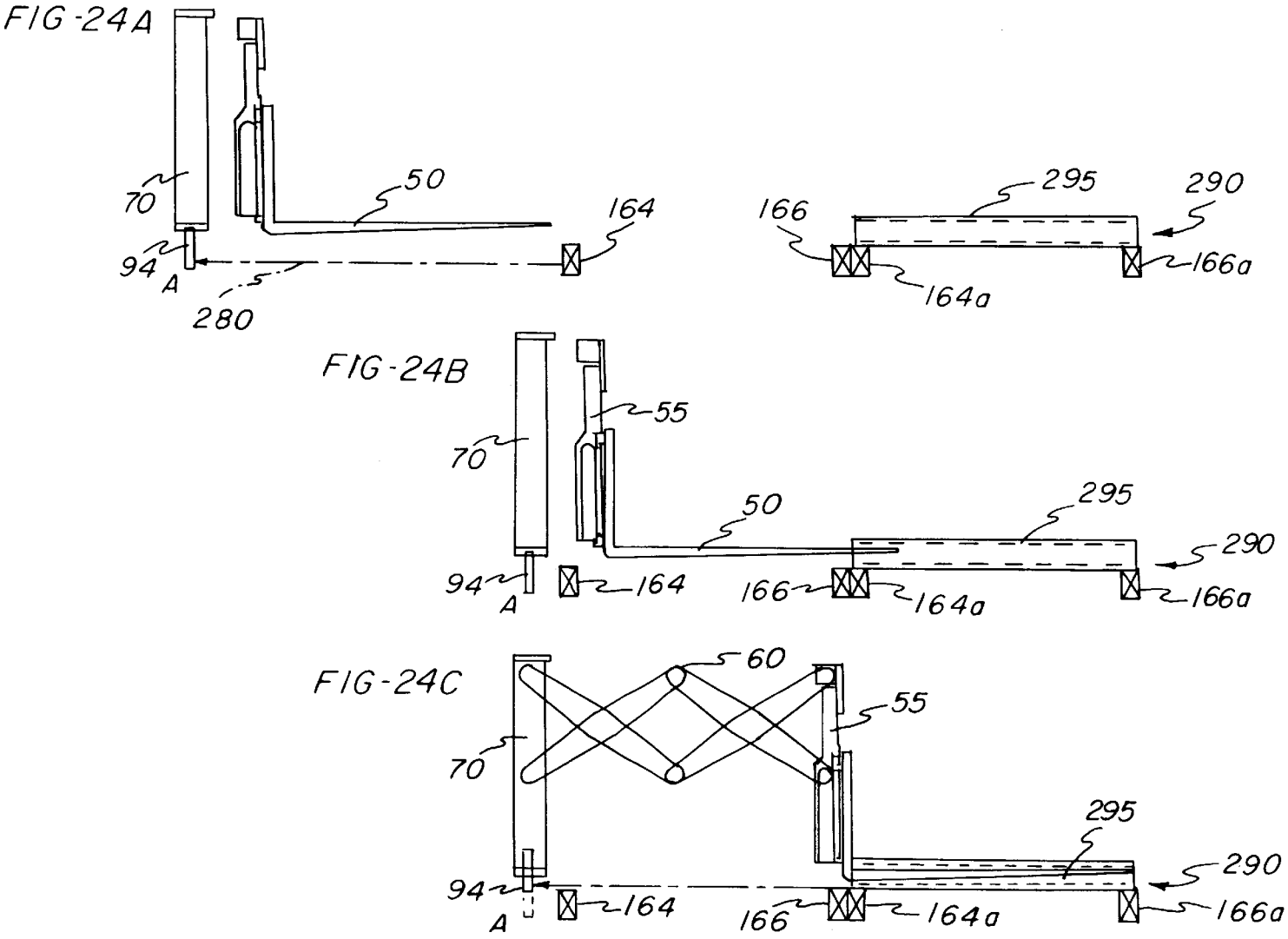
FIGS. 24A–24F are side elevational views illustrating the sequence of operations for picking up a pallet from a far rack of a double deep storage rack using a double reach fork lift truck with a single camera at two locations below the forks.

In FIG. 24B, the operator then drives the truck forward until the mast assembly 40 is near to contacting the bar 164. While moving forward, the operator continues to monitor the height alignment to the target. The operator may also view the forks while approaching the pallet on the rear rack, but as the camera nears the bar 164, the view will become obstructed because the perspective view above line 280 will be blocked by the bar.

In FIG. 24C, the operator selects the Reach mode represented by icon 173 and extends the forks to the position shown. During this operation, the camera will be elevated by approximately 3.5 inches, or to a second predetermined location relative to the forks, and the view line 280 will clear the top surface of bar 164, allowing the operator to see clearly the position of the forks relative to the pallet for approximately the last half of the fork extension movement. The movement of the camera housing and camera view line from the first to the second predetermined position below the forks upon extension of the forks is accomplished by means of the mechanism illustrated in FIGS. 21 and 22.

Figures 24D, 24E, 24F:
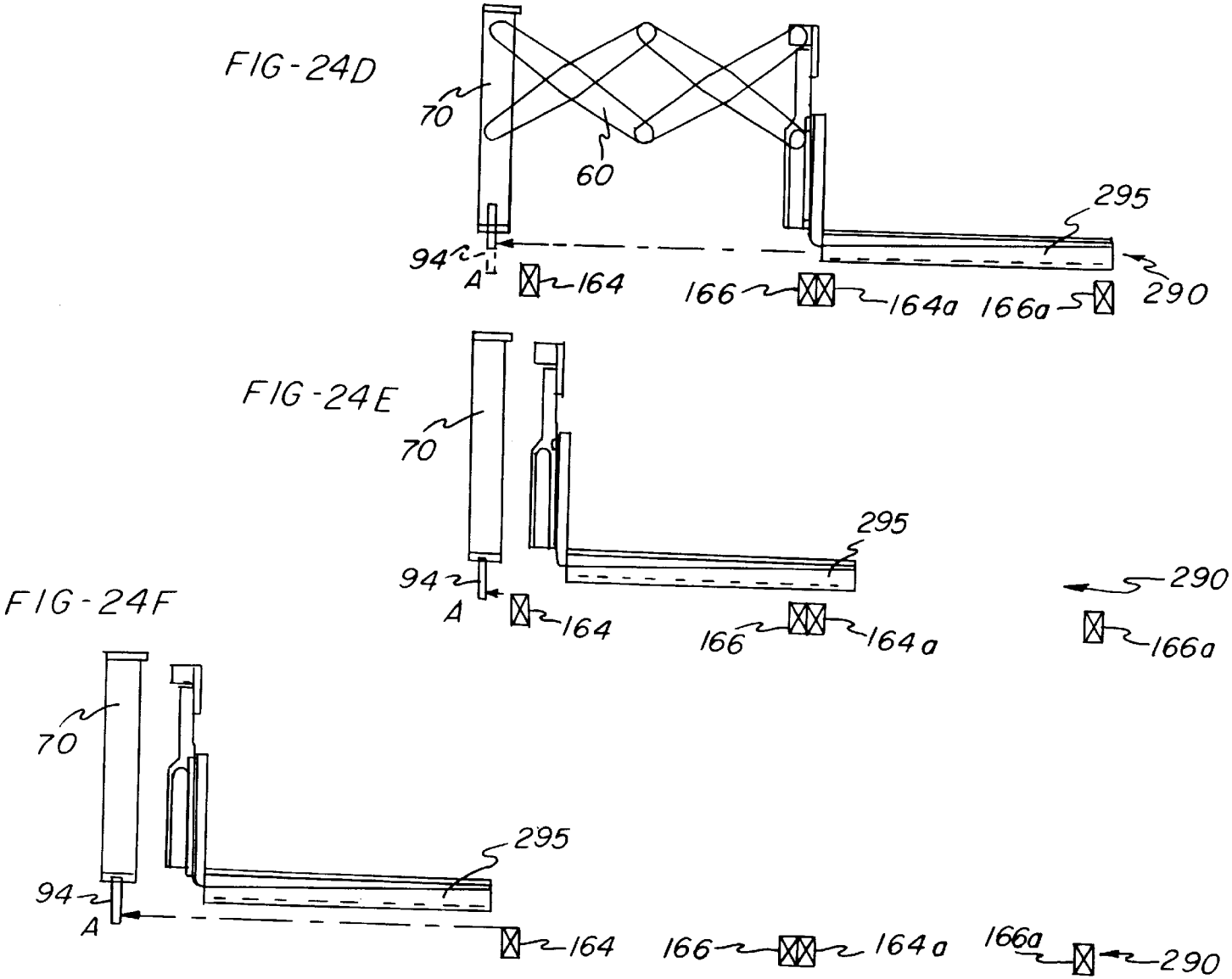

In FIG. 24D, the operator will elevate the load, by selecting the Raise/Lower mode represented by icon 174, and will tilt the ends of the forks slightly up, by selecting the Tilt mode represented by icon 172.

In FIG. 24E, the operator has selected the Reach mode represented by icon 173 and has retracted the load, then, as shown in FIG. 24F, the truck is driven rearwardly until the pallet is clear of the front bar 164. As the forks were being retracted between FIGS. 24D and 24E, the camera 92 will be lowered and returned to its first predetermined position. Again, the placing of a pallet on the rear rack will follow essentially the same procedure in reverse.

DUAL CAMERAS, NON-REACH MODE

The use of dual cameras can avoid the momentary blocking of the view, such as occurs in FIG. 24B when the truck is driven close to a rack. Referring now to the camera configuration of FIGS. 14 and 15 and the sequence of operations as represented in FIGS. 25A–25D, the truck is aligned facing a rack 290, as previously described.

Camera 92 is selected to align the elevation of the carriage assembly with the rack, using view line 280 and by selecting the Raise/Lower mode, icon 174. When the operator selects the Tilt function, icon 172, the view from camera 96, 98 will appear on the monitor 100, thus giving the operator a view of the ends of the forks with respect to the pallet 295 unobstructed by the bar 164. The selection between the view from camera 92 or 96, 98 may be accomplished automatically according to the position of the function selector 170 and electronically controlled camera switch 350 (FIG. 13), or by operation of a pallet detection switch 370; however, the operator may also manually select the camera view by means of manual selector switch 360. After tilting the forks slightly downward, and checking fork height alignment and side-shift alignment, the operator will drive the truck forward, FIG. 25B.

Figure 25A:
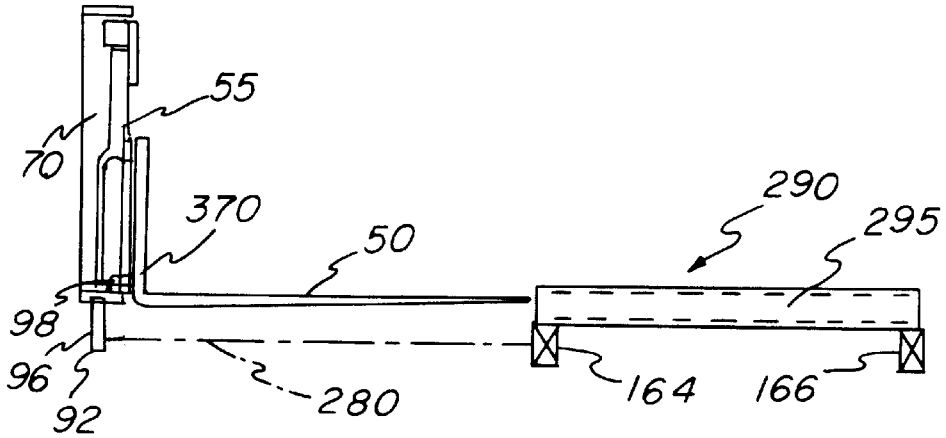
FIGS. 25A–25D are side elevational views illustrating the sequence of operations for picking up a pallet from a single rack employing two separate cameras.
Figure 25B:
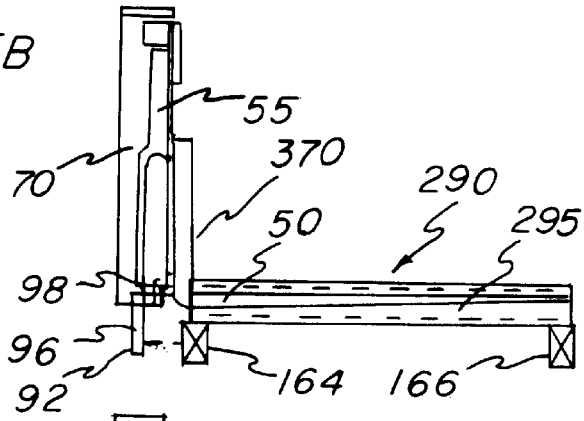
Figure 25C:
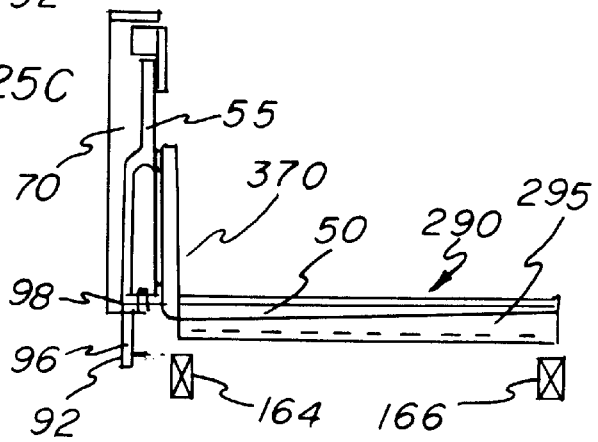
Figure 25D:
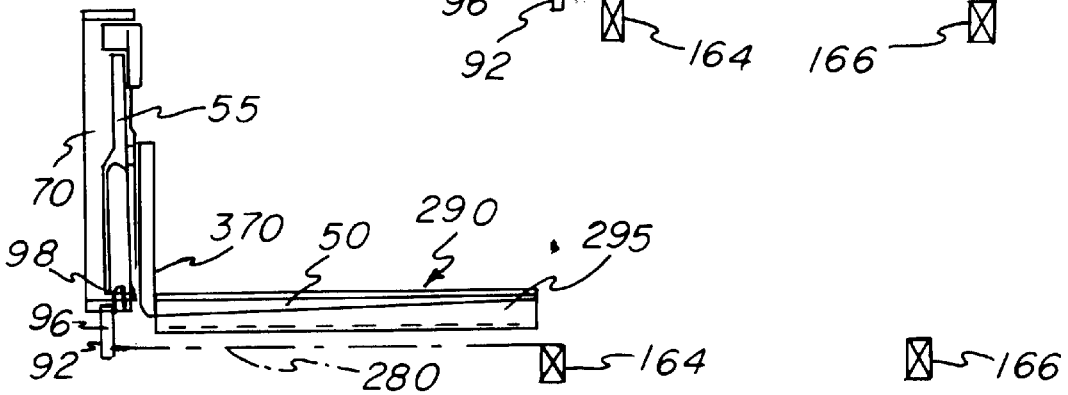

In FIG. 25C, the operator will select the Raise/Lower mode, icon 174, and the monitor will provide a view from camera 92, thus allowing the operator to raise and align the carriage assembly with the top of the marker 162 or top of horizontal bar 164. With the carriage assembly raised, the underside of the pallet is visible from camera 92, at which time the operator will select the Tilt mode, icon 172, raise the tips of the forks slightly with reference to fork level indicator 150 and reference mark 155, and then drive readward, FIG. 25D, after which the load may be lowered.

DUAL CAMERAS, SEPARATELY MOUNTED, DOUBLE REACH MODE

Figure 15:
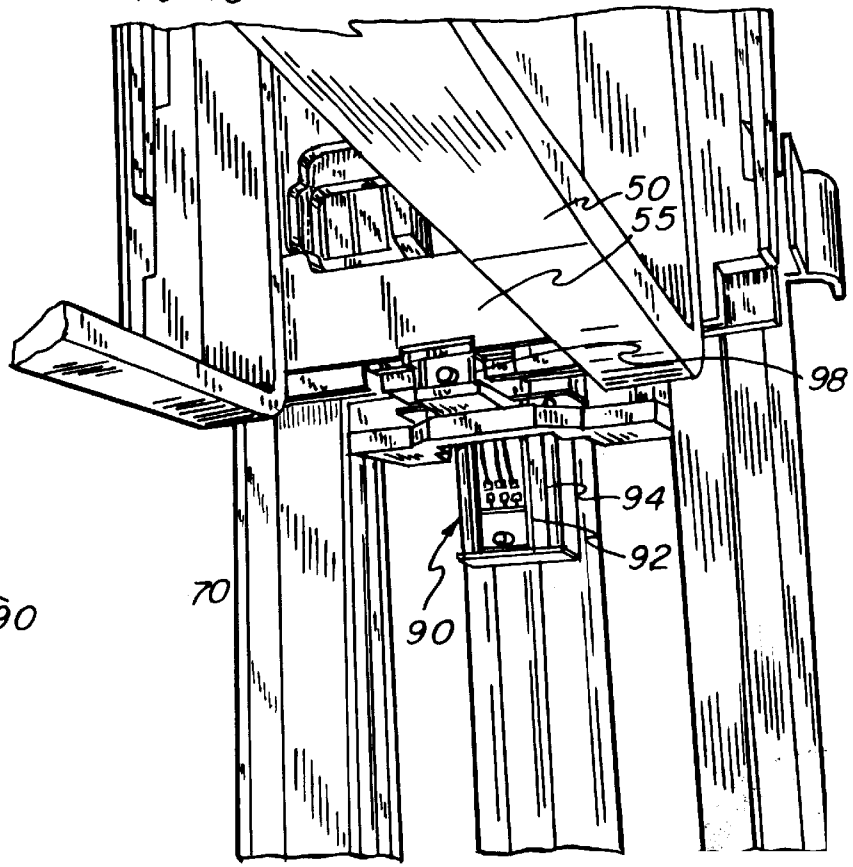
FIG. 15 is a perspective view looking upward at raised forks and showing one camera mounted on the carriage assembly and another camera centrally mounted between and behind the forks.

The dual camera arrangement of FIG. 15 also has application to use on a double reach truck, as illustrated in FIGS. 26A–26F. After aligning the truck with the rack, the operator selects the Raise/Lower mode, icon 174, and elevates the carriage assembly with reference to camera 92 and places the horizontal bar of reticle 160 at the bottom of the marker tape. The Tilt mode, icon 172, is then selected and the fork ends are tilted slightly downwardly. At this time, the view on monitor from camera 98 will be selected automatically. Camera 98 has a view line 284, which is also a horizontal plane. In this mode of operation, camera 92 will be selected whenever the Raise/Lower mode is selected or a pallet is fully engaged on the forks, and camera 98 will be selected whenever the operator selects the Reach, Tilt or Side-shift functions and a pallet is not fully engaged on the forks. A pallet detection switch 370 located on the fork carriage 55 and at the heel 134 of the forks 50 provides the necessary control signal.

Figure 26A:
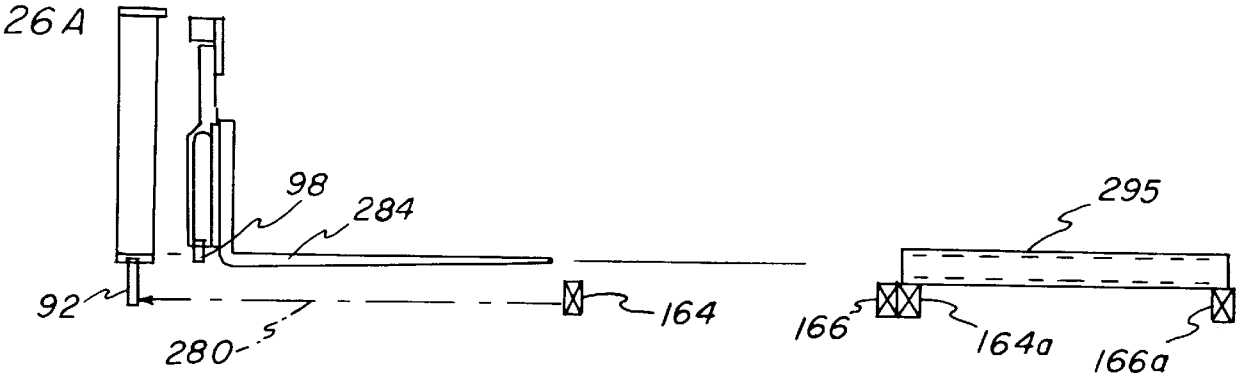
Figure 26B:
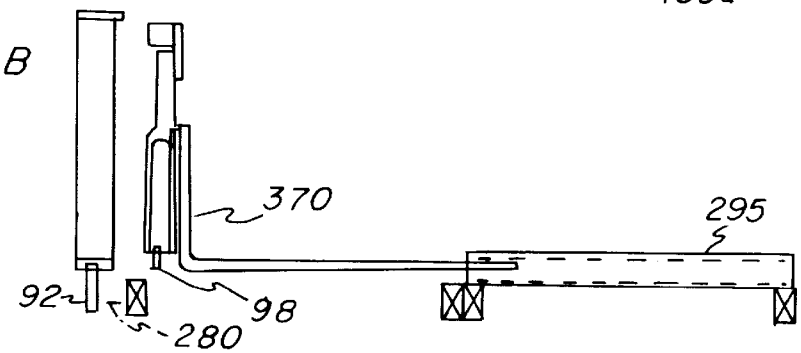
Figure 26C:
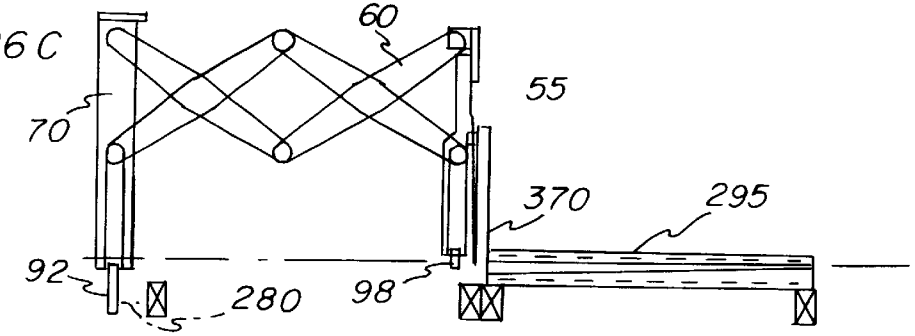

With camera 98 selected, the driver moves the truck forward until it is in close proximity to the rack 290 (FIG. 26B), while monitoring fork clearance and side-shift alignment. The operator then selects the Reach mode, icon 173, and watches as the forks extend into the pallet 295 (FIG. 26C). At this time, the pallet engages a switch located at the rear of the forks, on the fork carriage 55, and this causes the monitor to switch to the view shown by camera 92. The Raise/Lower mode is then selected by the operator to elevate the pallet, stopping the carriage assembly 70 so that the horizontal bar 161 of reticle 160 is at or slightly above the top edge of the rack, as shown in FIGS. 11 and 26D. Then the Tilt mode is selected and the tips of the forks raised slightly, while the operator observes the level indicator 150 on the monitor 100 (FIG. 26D) as well as the view along view line 280 from camera 92.

With the carriage assembly and load elevated, FIG. 26D, the view from camera 92 is above the top of bar 164, and therefore the operator can view the retracting operation to the position in FIG. 26E. Finally, in FIG. 26F, the truck itself is driven rearward, and while verifying aisle clearance, the truck may be turned and the load lowered.

While the second camera 98, FIG. 15, has been described in connection with FIGS. 26A through 26F, it should be understood that the camera 96 shown in FIG. 14 could also be employed.

DUAL CAMERAS IN RETRACTABLE MOUNT, DOUBLE REACH MODE

Figure 14:
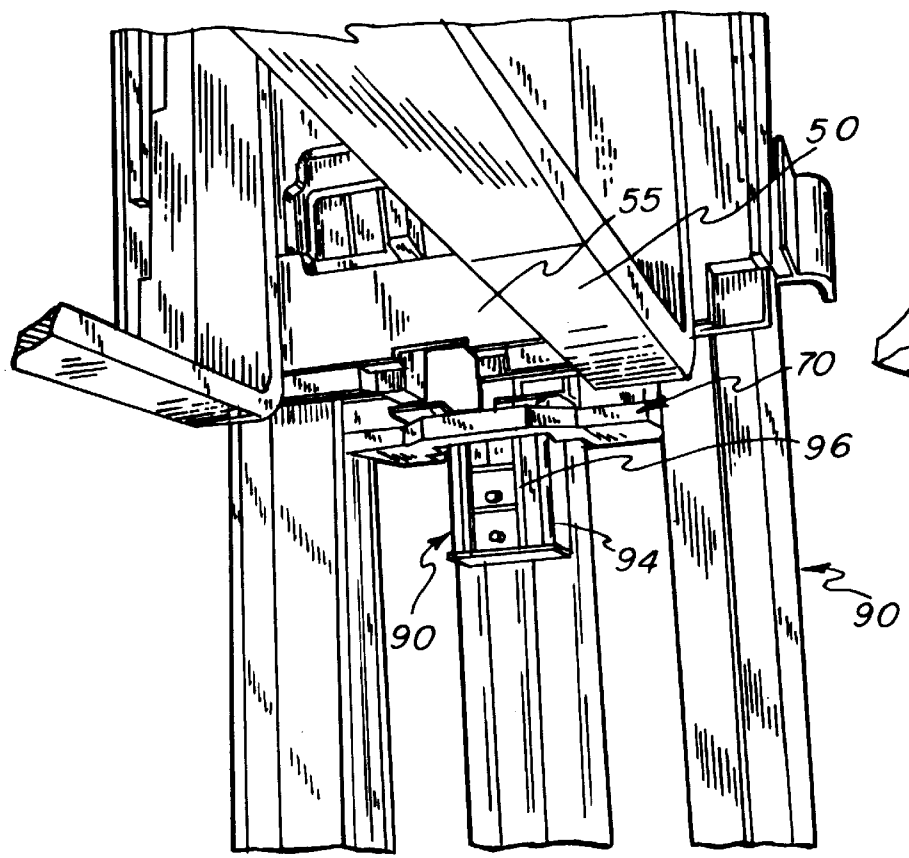
FIG. 14 is a perspective view looking upward at raised forks and showing a camera assembly mounted on the carriage assembly.

The dual camera arrangement of FIG. 14 also has application to use on a double reach truck, as illustrated in FIGS. 27A–27F. After aligning the truck with the rack, the operator selects the Raise/Lower mode, icon 174, and elevates the carriage assembly with reference to camera 92 and places the horizontal bar of reticle 160 at the bottom of the marker tape. The Tilt mode, icon 172, is then selected and the fork ends are tilted slightly downwardly. At this time, the view on monitor from camera 96 will be selected automatically. In this mode of operations, camera 92 will be selected whenever the Raise/Lower mode is selected and the reach mechanism is fully retracted, while camera 96 will be selected whenever the operator selects the Reach, Tilt or Side-shift functions or the reach mechanism is in an extended position. A reach position activated switch 375, located on the carriage assembly 70 and activated at the retracted position by fork carriage 55, provides the necessary control signal.

Figure 27A:
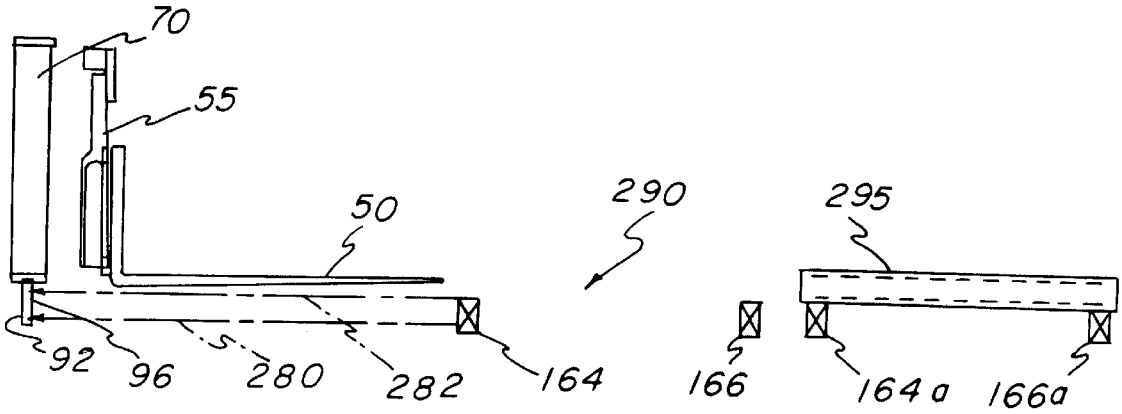
FIGS. 27A–27F are side elevational views illustrating the sequence of operations for picking up a pallet from the far rack of a double deep storage rack employing two cameras mounted in a common housing.
Figure 27B:
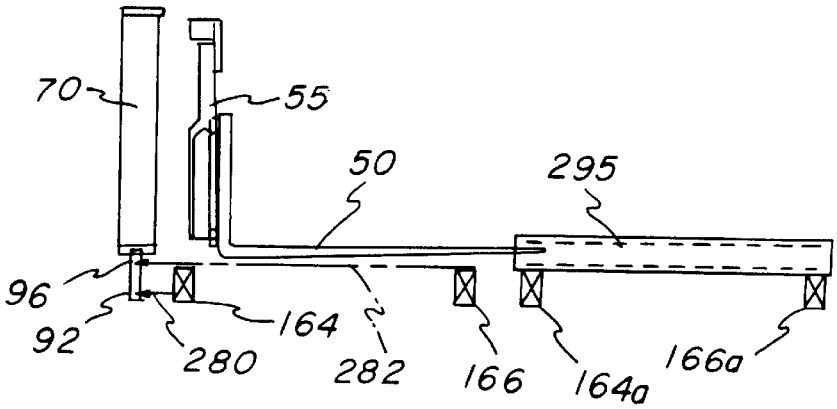
Figure 27C:
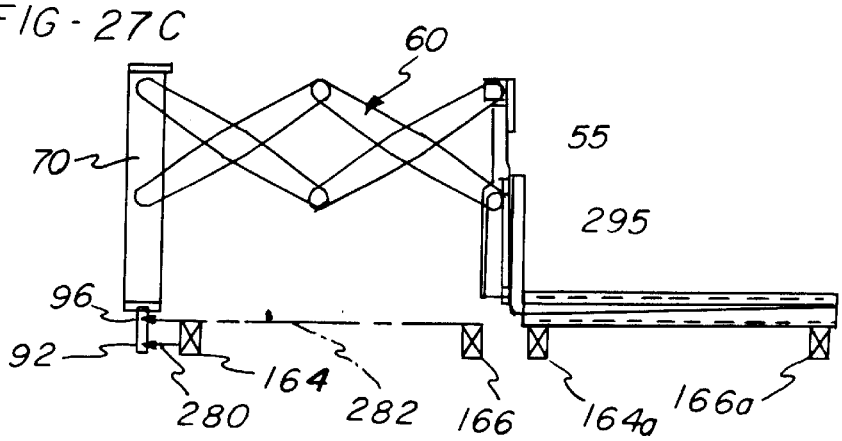
Figure 27D:
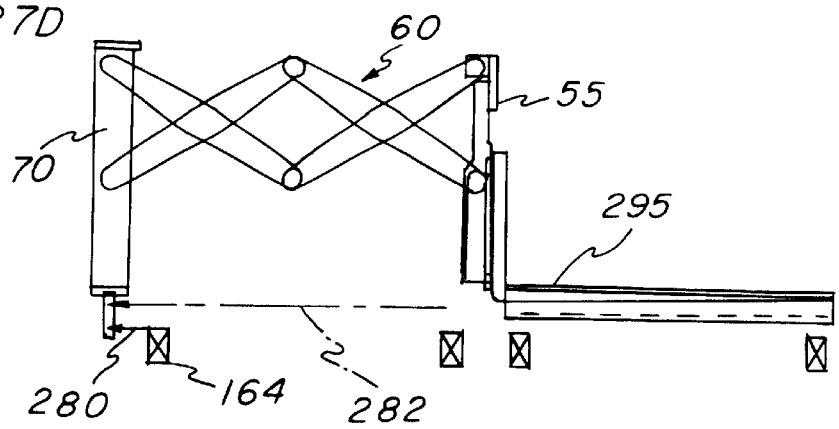

With camera 96 selected, the driver moves the truck forward until it is in close proximity to the rack 290 (FIG. 27B), while monitoring fork clearance and side-shift alignment. The operator then selects the Reach mode, icon 173, and watches as the forks extend into the pallet 295 (FIG. 27C). The Raise/Lower mode is then selected and the pallet raised clear of the rack, then the Tilt mode is selected and the tips of the forks raised slightly, while the operator observes the fork level indicator 150 on the monitor 160 (FIG. 27D) as well as the lower perspective view along view line 282 from camera 96. View line 282 is also a horizontal plane.

Figure 27E:
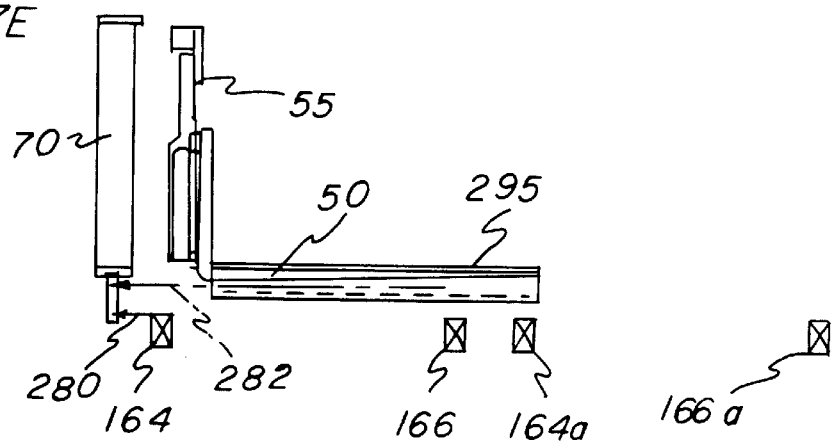
Figure 27F:
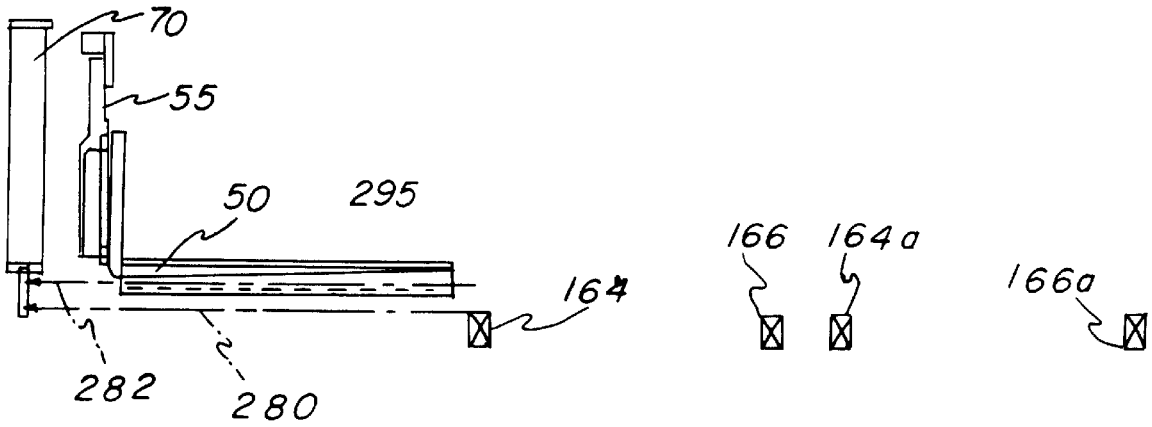

With the forks retracted, FIG. 27E, the view from camera 96 is switched to camera 92, and therefore the operator can view the retracting operation, first with camera 96 and final movements with camera 92. Finally, in FIG. 27F, the truck itself is driven rearward, and while verifying aisle clearance, the truck may be turned and the load lowered.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A fork lift truck including a pair of forks for supporting a load, means for raising and lowering said forks, means for tilting said forks relative to a body of said truck, a level sensor mounted on at least one of said forks for providing an indication of the level position of said forks with respect to a horizontal plane, a display terminal including a screen mounted for viewing by an operator *during normal operation of said truck*, and means responsive to said level sensor for displaying an indication of the level position of said forks with respect to the horizontal plane on *said screen of* said display terminal, including a reference bar on said screen representing the horizontal plane, and an indicator on said screen for showing the actual position of said forks with respect to the horizontal plane, thereby to assist the operator in adjusting the level of said forks prior to loading, moving or unloading a load from said forks.

2. The fork lift truck of claim 1 wherein said level sensor is mounted approximately midway the length of at least one of said forks.

3. The fork lift truck of claim 1 wherein said level sensor is an electrolytic tilt sensor.

4. In a fork lift truck including a pair of forks for supporting a load, means for raising and lowering said forks and for tilting said forks relative to a body of the truck, a camera mounted near a plane of said forks, said camera having a lens for viewing the scene immediately in front of the forks, a display terminal including a screen for presenting to an operator an image of the scene viewed by the lens, the improvement including

*said display terminal being mounted to said truck during normal operation thereof,* a level sensor mounted on at least one of said forks for providing an indication of the level position of said forks with respect to a horizontal plane, *and* means for displaying an indication of the level position of said forks on said display terminal, including a reference bar on said screen representing the horizontal plane, and an indicator on said screen for showing the actual position of said forks with respect to the horizontal plane, whereby the operator is provided with both an image of the scene in front of the forks and an indication of the level of the forks thereby to assist the operator in adjusting the vertical position and level of said forks prior to loading, moving or unloading a load from said forks.

5. The fork lift truck of claim 4 wherein said display terminal includes a television screen.

6. The fork lift truck of claim 4 wherein said camera is aligned to define the horizontal plane through its center of view, and means for generating a reticle, including a visual representation of said horizontal plane, on said display terminal to assist an operator in vertically positioning said carriage assembly.

* * * * *